United States Patent
Dobbins et al.

[19]

[11] Patent Number: 5,825,772
[45] Date of Patent: Oct. 20, 1998

[54] DISTRIBUTED CONNECTION-ORIENTED SERVICES FOR SWITCHED COMMUNICATIONS NETWORKS

[75] Inventors: Kurt Dobbins, Bedford; Thomas A. Grant, Derry; David J. Ruffen, Salem; Laura Kane, Merrimack; Theodore Len, Amherst; Philip Andlauer, Londonderry; David H. Bahi, Manchester; Kevin Yohe, Amherst; Brendan Fee, Nashua; Chris Oliver, Rochester; David L. Cullerot, Manchester; Michael Skubisz, Durham, all of N.H.

[73] Assignee: Cabletron Systems, Inc., Rochester, N.H.

[21] Appl. No.: 626,596

[22] Filed: Apr. 2, 1996

Related U.S. Application Data

[63] Continuation-in-part of Ser. No. 559,738, Nov. 15, 1995, Pat. No. 5,684,800.

[51] Int. Cl.[6] .............................. H04L 12/56; H04L 12/44
[52] U.S. Cl. .......................... 370/396; 370/401; 370/410
[58] Field of Search ................................... 370/216, 225, 370/238, 256, 395, 396, 400, 401, 402, 407, 408, 351, 410

[56] References Cited

U.S. PATENT DOCUMENTS

| | | | |
|---|---|---|---|
| 4,912,656 | 3/1990 | Cain et al. | 364/514 |
| 5,056,085 | 10/1991 | Vu | 370/400 |
| 5,193,152 | 3/1993 | Smith | 395/200 |
| 5,265,092 | 11/1993 | Soloway et al. | 370/396 |
| 5,309,437 | 5/1994 | Perlman et al. | 370/401 |

(List continued on next page.)

FOREIGN PATENT DOCUMENTS

| | | |
|---|---|---|
| 0282198 A1 | 9/1988 | European Pat. Off. . |
| 0405042 A1 | 1/1991 | European Pat. Off. . |
| 0480555 A1 | 4/1992 | European Pat. Off. . |

(List continued on next page.)

OTHER PUBLICATIONS

Gruchevsky et al., "The Burroughs Integrated Adaptive Routing System," Computer Communications Review, vol. 17, No. 1–2, 1987, New York (USA), pp. 18–34.

(List continued on next page.)

*Primary Examiner*—Chau Nguyen
*Attorney, Agent, or Firm*—Wolf, Greenfield & Sacks, P.C.

[57] ABSTRACT

Method and apparatus providing connection-oriented services for packet switched data communications networks. Directory services include distributed discovery of MAC addresses and protocol alias addresses. Topology services include a link state topology exchange among switches, which provides each switch with a complete topology graph of the network. This enables an access switch receiving a data packet to determine a complete path from a source end system to a destination end system. Another service includes resolution of broadcast frames to unicast frames, in order to reduce the amount of broadcast traffic. Policy restrictions may be applied prior to connection setup. Path determination services enable multiple paths from a source to a destination. Connection management includes source routed mapping of connections on the desired path. A distributed call rerouting service is provided wherein if a link on an active path fails, each switch receives a topology change notification and unmaps any connection involving the failed link. A broadcast/unknown service provides restricted flooding of nonresolvable packets. Furthermore, connection-oriented switching is provided based on the source and destination MAC addresses as a connection identifier. Still further, resolution of networks outside the switch domain is enabled by access switches listening for network and server route advertisements and maintaining best routes to said networks and servers. The best route metrics may be combined with best path metrics to determine a path from a first access switch to an egress switch connected to the external network.

29 Claims, 20 Drawing Sheets

U.S. PATENT DOCUMENTS

| | | | |
|---|---|---|---|
| 5,323,394 | 6/1994 | Perlman | 370/401 |
| 5,394,402 | 2/1995 | Ross | 370/402 |
| 5,485,455 | 1/1996 | Dobbins et al. | 370/60 |
| 5,497,368 | 3/1996 | Reijnierse et al. | 370/406 |
| 5,500,860 | 3/1996 | Pearlman et al. | 370/401 |
| 5,633,869 | 5/1997 | Burnett et al. | 370/396 |

FOREIGN PATENT DOCUMENTS

| | | |
|---|---|---|
| 0 609 990 A2 | 8/1994 | European Pat. Off. . |
| WO 95/01023 | 1/1995 | WIPO . |
| WO 95/04420 | 2/1995 | WIPO . |

OTHER PUBLICATIONS

Kaliszewski, "Routing Algorithm And Route Optimization On SITA Data Transport Network," Global Communications Conference, vol. 2, Dec. 1983 (USA), pp. 892–897.

Catania et al., "A Routing Strategy For Man Interconnection," Networking In The Nineties, Bal Harbour, Apr. 7–11, 1991, vol. 2, Apr. 7, 1991, Institute of Electrical And Electronics Engineers, pp. 608–615.

Lai, "Packet Forwarding," IEEE Communications Magazine, vol. 26, No. 7, Jul. 1988 (USA), pp. 8–17.

Spiegal et al., "An Alternate Path Routing Scheme Supporting QOS And Fast Connection Setup In ATM Networks," Proceedings of the Global Telecommunications Conference (GLOBECOM), San Francisco, Nov. 28 to Dec. 2, 1994, vol. 2 of 3, Nov. 28, 1994, Institute of Electrical and Electronics Engineers, pp. 1224–1230.

Cheriton et al., "Host Groups: A Multicast Extension For Datagram Internetworks," Data Communications Symposium, Sep. 1985, pp. 172–179 (USA).

"Method For Assigning Network Applications To Users and Groups," IBM Technical Disclosure Bulletin, vol. 37, No. 4b, Apr. 1994 (New York, USA).

C.D. Comer, "Internetworking with TCP/IP, vol. 1, Principals, Protocols and Architecture," Prentice Hall, Englewood Cliffs, New Jersey, 2nd Ed., Chap. 16, pp. 265–280.

Newman, "ATM Local Area Networks," IEEE Communications Magazine, vol. 32, No. 3, 1 Mar. 1994, pp. 86–98.

Asoh et al., "Virtual LAN Realization on an ATM Connectionless Public Network," 2nd Asia Pacific Conference On Communications, vol. 2, pp. 516–520, Jun. 1995, Japan.

| SWITCH PORT | DEVICE MAC ADDRESS | NODE STAT | CALL TAG | LAST HEARD | AGE | ALIAS COUNT | VLAN COUNT |
|---|---|---|---|---|---|---|---|
| 2 | 08:00:20:18:7A:E4 | LOCAL | 3860 | 0 days 00:00:00.00 | 0 days 00:10:46.14 | 1 | 1 |
| 6 | 00:00:10:1A:12:DE | VIRTUAL NODE | 0000 | 0 days 00:00:00.00 | 0 days 00:00:00.00 | 1 | 0 |
| 1 | 00:00:F6:00:5E:EB | LOCAL | 372b | 0 days 00:00:00.00 | 0 days 00:11:23.56 | 1 | 1 |
| 2 | 00:00:F6:00:5D:E7 | LOCAL | 3716 | 0 days 00:00:00.00 | 0 days 00:10:47.02 | 1 | 1 |
| 2 | 08:00:20:0E:47:C4 | LOCAL | 3870 | 0 days 00:00:00.00 | 0 days 00:10:46.19 | 1 | 1 |
| 2 | 08:00:20:1F:FF:8F | LOCAL | 37e3 | 0 days 00:00:00.00 | 0 days 00:10:47.18 | 1 | 1 |
| 2 | 08:00:20:1F:C1:72 | LOCAL | 37d5 | 0 days 00:00:00.00 | 0 days 00:10:47.34 | 1 | 1 |
| 2 | 08:00:20:20:00:6D | LOCAL | 37f7 | 0 days 00:00:00.00 | 0 days 00:10:47.12 | 1 | 1 |
| 2 | 08:00:20:73:C9:11 | LOCAL | 3800 | 0 days 00:00:00.00 | 0 days 00:10:47.09 | 1 | 1 |
| 2 | 00:00:78:00:01:BE | LOCAL | 3892 | 0 days 00:00:00.00 | 0 days 00:10:46.08 | 1 | 1 |
| 1 | 08:00:69:07:9C:68 | LOCAL | 37c3 | 0 days 00:00:00.00 | 0 days 00:11:22.74 | 1 | 1 |
| 2 | 00:00:1D:0E:94:57 | LOCAL | 3851 | 0 days 00:00:00.00 | 0 days 00:10:46.54 | 1 | 1 |
| 1 | 00:00:8E:06:12:52 | LOCAL | 37c0 | 0 days 00:00:00.00 | 0 days 00:11:22.89 | 1 | 1 |
| 2 | 00:00:1D:18:67:38 | LOCAL | 37cd | 0 days 00:00:00.00 | 0 days 00:10:47.60 | 1 | 1 |
| 2 | 08:00:20:71:A0:D6 | LOCAL | 37da | 0 days 00:00:00.00 | 0 days 00:10:47.51 | 1 | 1 |
| 1 | 00:00:1D:0B:67:3B | LOCAL | 37bd | 0 days 00:00:00.00 | 0 days 00:11:22.99 | 1 | 1 |
| 1 | 00:00:1D:17:FC:2E | LOCAL | 37c2 | 0 days 00:00:00.00 | 0 days 00:11:22.92 | 0 | 1 |
| 2 | 00:00:1D:1E:89:FE | LOCAL | 3890 | 0 days 00:00:00.00 | 0 days 00:10:46.31 | 1 | 1 |
| 1 | 00:00:1D:1F:12:FA | LOCAL | 0000 | 0 days 00:00:00.00 | 0 days 00:11:23.88 | 0 | 1 |

*FIG. 3a*

| OWNER SWITCH | SWITCH PORT | DEVICE MAC ADDRESS | ALIAS TYPE | ALIAS ADDRESS | VLAN POLICY | VLAN ID |
|---|---|---|---|---|---|---|
| 00:00:1D:1A:12:DE | 2 | 00:00:1D:1E:89:FE | IP | 134.141.42.9 | 1-OTHER | RED |
| 00:00:1D:1A:12:DE | 2 | 00:00:1D:0E:94:57 | IP | 134.141.42.77 | 1-OTHER | RED |
| 00:00:1D:1A:12:DE | 2 | 08:00:20:1F:FF:67 | IP | 134.141.42.61 | 1-OTHER | BLUE |
| 00:00:1D:1A:12:DE | 2 | 00:00:1D:18:67:38 | IP | 134.141.109.54 | 1-OTHER | BLUE |
| 00:00:1D:1A:12:DE | 1 | 00:00:1D:18:67:38 | IP | 134.141.106.53 | 1-OTHER | RED |
| 00:00:1D:1A:12:DE | 1 | 00:00:E6:00:5E:EB | IP | 134.141.42.50 | 1-OTHER | BLUE |
| 00:00:1D:1A:12:DE | 2 | 08:00:69:07:9C:68 | IP | 134.141.43.42 | 1-OTHER | DEFAULT |
| 00:00:1D:1A:12:DE | 2 | 08:00:20:71:A0:DE | IP | 134.141.40.32 | 1-OTHER | RED |
| 00:00:1D:1A:12:DE | 1 | 00:00:1D:18:67:38 | IP | 134.141.45.30 | 1-OTHER | RED |
| 00:00:1D:1A:12:DE | 2 | 00:00:9E:05:12:52 | IP | 134.141.43.29 | 1-OTHER | RED |
| 00:00:1D:1A:12:DE | 2 | 03:00:20:75:C9:11 | IP | 134.141.180.20 | 1-OTHER | RED |
| 00:00:1D:1A:12:DE | 2 | 00:00:1D:18:67:38 | IP | 0221667384000B6 | 1-OTHER | DEFAULT |
| 00:00:1D:1A:12:DE | 1 | 00:00:1D:0B:67:38 | IP | 134.141.42.240 | 1-OTHER | DEFAULT |
| 00:00:1D:1A:12:DE | 6 | 00:00:1D:13:12:DE | IP | 134.141.42.213 | 1-OTHER | DEFAULT |
| 00:00:1D:1A:12:DE | 2 | 00:00:F6:00:53:67 | IP | 134.141.42.212 | 1-OTHER | BLUE |
| 00:00:1D:1A:12:DE | 2 | 08:00:20:1F:C1:72 | IP | 134.141.42.201 | 1-OTHER | BLUE |
| 00:00:1D:1A:12:DE | 2 | 08:00:20:20:00:60 | IP | 134.141.42.150 | 1-OTHER | BLUE |
| 00:00:1D:1A:12:DE | 2 | 08:00:20:18:7A:E4 | IP | 134.141.43.183 | 1-OTHER | RED |
| 00:00:1D:1A:12:DE | 2 | 08:00:20:03:47:C4 | IP | 134.141.43.183 | 1-OTHER | RED |
| 00:00:1D:1A:12:DE | 2 | 00:00:78:00:01:BE | IP | 134.141.42.132 | 1-OTHER | BLUE |

*FIG. 3b*

| SWITCH PORT | DEVICE MAC ADDRESS | NODE STATE | CALL TAG | LAST HEARD | AGE | ALIAS COUNT | VLAN COUNT | ... |
|---|---|---|---|---|---|---|---|---|
|  |  |  |  |  |  |  |  |  |
|  |  |  |  |  |  |  |  |  |
|  |  |  |  |  |  |  |  |  |
*FIG. 4a*
| SWITCH PORT | DEVICE MAC ADDRESS | NODE STATE | CALL TAG | LAST HEARD | AGE | ALIAS COUNT | VLAN COUNT | ... |
|---|---|---|---|---|---|---|---|---|
|  |  |  |  |  |  |  |  |  |
|  |  |  |  |  |  |  |  |  |
*FIG. 4b*
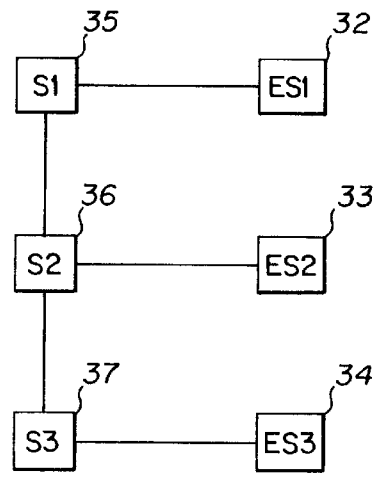
*FIG. 5a*
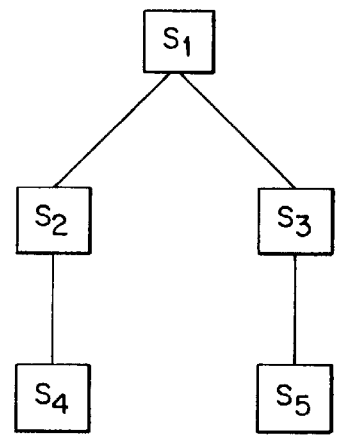
*FIG. 5b*

| AreaID | Type | LSID | Switch ID | Sequence | AGE | Checksum | Advertisment |
|---|---|---|---|---|---|---|---|
| 0.0.0.0 | 1-switch-link | 08:00:20:1d:8f:0b:00:00:00:00 | 08:00:20:1d:8f:0b:00:00:00:00 | -214748364 | 0 | 4035 | 00:00:00:01:08:00:20:1d:... |
| 0.0.0.0 | 1-switch-link | 08:00:20:20:00:7b:00:00:00:00 | 08:00:20:20:00:7b:00:00:00:00 | -214748364 | 1 | 36505 | 00:01:00:01:08:00:20:20:... |
| 0.0.0.0 | 2-connection-link | 08:00:20:20:00:7b:00:00:00:02 | 08:00:20:20:00:7b:00:00:00:00 | -214748364 | 1 | 35753 | 00:01:00:02:08:00:20:20:... |

FIG. 6a

| IPAddress | IPAddressLess | Switch ID | Options | Priority | State | Events | LSRetransQLen | NBMAStatus |
|---|---|---|---|---|---|---|---|---|
| 08:00:20:20:00:7b:00:00:00:02 | 0 | 08:00:20:20:00:7b:00:00:00:00 | 3 | 1 | 8-full | 7 | 0 | 1-valid |

FIG. 6b

| Switch Port Pair | SWDestAddr | Mask | LSTypeOne | LinkStateID | AdvR |
|---|---|---|---|---|---|
| 08:00:20:20:00:7b:00:00:00:02 | 08:00:20:20:00:7b:00:00:00:02 | 00:00:00:00:00:00:00:00:00:00 | 02 | 08:00:20:20:00:7b:00:00:00:02 | 08:00:... |

FIG. 6c

| SAME VLAN | POLICY | ACTION |
|---|---|---|
| YES | OPEN | CONNECT |
| NO | OPEN | CONNECT |
| YES | (ONE OR BOTH) SECURE | CONNECT |
| NO | (ONE OR BOTH) SECURE | FILTER |

| SAME VLAN | POLICY | ACTION |
|---|---|---|
| X DON'T CARE | X DON'T CARE | FLOOD TO SOURCE VLAN |
|  |  |  |

| DA | SA | Status | Hop1 | Hop2 | Hop3 |
|---|---|---|---|---|---|
| 00:00:6E:00:0C:F8 | 00:00:8E:06:10:2C | 1-Building | 00:00:1D:1F:19:15_06:00:00:00 | 72:6E:65:74:00:00_00:00:00:00 | 61:64:64:72:65:73_73:2E: |

*FIG. 12*

| LinkName | CnxCount |
|---|---|
| 00:00:1D:1F:19:15_06:00:00:00 | 1 |
| 61:64:64:72:65:73:73_2E:76:6C | 1 |
| 72:6E:65:74:00:00_00:00:00:00 | 1 |

*FIG. 13*

| Connection ID | Owner Switch | DA | SA | OPCODE (1=MAP 2=MAPACK) | LINK COUNT (TOTAL PORTS IN PATH) | CURRENT LINK | SOURCE PORT PAIRS |
|---|---|---|---|---|---|---|---|

*FIG. 14* ant DISTRIBUTED CONNECTION-ORIENTED
SERVICES FOR SWITCHED
COMMUNICATIONS NETWORKS

RELATED APPLICATIONS

This is a continuation-in-part of and commonly owned U.S. Ser. No. 08/559,738 filed Nov. 15, 1995, U.S. Pat. No. 5,684,800, entitled "METHOD FOR ESTABLISHING RESTRICTED BROADCAST GROUPS IN A SWITCHED NETWORK," by K. Dobbins et al., which is hereby incorporated by reference in its entirety.

FIELD OF THE INVENTION

This invention relates to various methods and apparatus which provide distributed connection-oriented services for switched data communications networks, the services provided being scalableable, allowing fully active mesh topologies, reducing broadcast traffic, and enabling connections to networks and servers outside the switch domain.

BACKGROUND OF THE INVENTION

Most data communications networks today rely heavily on shared-media, packet-based LAN technologies for both access and backbone connections. These networks use bridges and routers to connect multiple LANs into global internets.

A router-based, shared-media network cannot provide the high bandwidth and quality of service required by the latest networking applications and new faster workstations. For example, multimedia and full-motion video applications consume large amounts of bandwidth and require real-time delivery. Another high bandwidth application involves transmission of X-ray and other diagnostic information to enable doctors in different locations to consult while accessing the same patient information. Yet another application is "collaborative" engineering, i.e., allowing multiple engineers to work on the same project simultaneously while at different geographic locations. Thus, networks once used primarily for sending text files and E-mail or sharing common databases, are now being pushed to their limits as more users push more data across them.

One way to provide additional bandwidth on a given network segment is with larger shared-media pipes, such as FDDI or Fast Ethernet; however, this does not enable the application of policy or restricted access to the enhanced network resources. Alternatively, a network can be further segmented with additional router or bridge ports; however, this increases the cost of the network and the complexity of its management and configuration.

Switched networking is a proposed solution intended to provide additional bandwidth and quality of service. In such networks, the physical routers and hubs are replaced by switches and a management system is optionally provided for monitoring the configuration of the switches. The overall goal is to provide a scalable high-performance network where all links between switches can be used concurrently for connections.

One proposal is to establish a VLAN switch domain—a VLAN is a "logical" or "virtual" LAN in which users appear to be on the same physical (or extended) LAN segment, even though they may be geographically separated. However, many VLAN implementations restrict VLAN assignments to ports, rather than end systems, which limits the effectiveness of the VLAN groupings. Other limitations of existing VLAN implementations include excessive broadcast traffic (which consume both network bandwidth and end system CPU bandwidth), disallowing transmissions out multiple ports, hop-by-hop switching determinations, and requiring multi-protocol routers to enable transmission between separate VLANs. Another problem with many VLAN switched networks is that although they allow a meshed topology, none of the redundant links can be active at the same time. Generally, the active links are determined by a spanning tree algorithm which finds one loop-free tree-based path through the network. Unfortunately, any links or nodes not in the active tree path are placed in standby.

Thus, there are numerous limitations with many prior switched communications networks.

SUMMARY OF THE INVENTION

In accordance with certain broad aspects of the present invention, methods and apparatus are provided which enable one or more of the following services:

directory (distributed discovery of MAC addresses and protocol alias addresses)

topology (distributed topology protocol exchanges among access and network switches)

broadcast resolution (resolution of broadcast frames to unicast frames at access switches)

policy (applying security restrictions prior to connection setup)

path determination (determine multiple paths from source to destination)

connection management (source-routed mapping of connections on a desired path)

call rerouting (distributed rerouting of a call when a link fails)

broadcast/unknown service (restricted flooding of nonresolvable packets)

connection-oriented switching (source-destination MAC addresses used as a connection key)

According to a first aspect of the invention, a fully distributed switching model is provided in which each switch is capable of processing all aspects of the call processing and switching functionality. Each switch maintains a local directory of locally-attached end systems on access ports. As each local end system generates MAC frames, the switch "learns" the source MAC frame as well as any higher level protocol address information; these higher layer addresses are referred to as alias addresses since they alias (or rename) the MAC end system. Thus, all end system network and MAC mappings are discovered automatically at each access port on the switch.

The local directory may also store local VLAN mappings. VLAN mappings identify the logical LAN to which the switch port or user belongs. A logical or virtual LAN allows users to appear as being on the same physical (or extended) LAN segment even though they may be geographically separated. By default, all ports and users are on a "default" or base VLAN.

More specifically, the VLAN-IDs are used only for policy and to scope broadcast/unknown destinations.

With each access switch having its own locally learned mappings in the directory, there is a "virtual directory" which provides a scalable, demand-based mechanism for distributing directory mappings through the switch domain. The virtual directory is defined as the collective directory mappings that exist in each switch within the domain. So, at all times, the virtual directory always has the complete mappings of all known users within the domain. It is not necessary to distribute or synchronize the switches' directory between themselves. Rather, each switch may access its local directory cache for locally attached end systems, and if the end system is not found in the local directory cache, there is triggered a query to the virtual directory, i.e., to each of the remote switches local directory. This means that at any given access switch, virtual directory queries are made only for destination addresses that are not in the local directory.

The call-originating switch which cannot resolve a mapping locally within its own directory, issues a resolve to the virtual directory by "VLAN ARPing". This is similar to how IP hosts resolve destination IP addresses to MAC addresses, but instead of "ARPing" to all end systems, the VLAN resolve message is sent only to other switches within the VLAN domain. Only the switch having the local directory mapping of the requested resolve information, known as the "owner" switch, will respond; multiple owners may exist if an end system is redundantly connected. All resolutions are then stored as remote entries in the call-originating switches' remote directory. The owner switch is stored along with the resolve information in the remote directory. The combination of the local directory and inter-switch resolve messaging provides mobility (i.e., end systems can attach anywhere in the network).

The directory of resolved mappings becomes in essence another cache. These entries reflect active or attempted connectivity resolutions, so the cache is self-adjusting for the source-destination traffic. It will size automatically to the actual resolution requirements of the call-originating switch.

Another important aspect of the invention is to provide topology and connection services which include the following:

distributed link state protocol
 distributed path determination
 distributed connection management
 distributed threading the needle
 distributed call rerouting.

The topology services are built into every switch, which allows each switch to be completely autonomous in its behavior, yet provides the necessary functionality across the entire switching fabric.

The switches run a distributed link state protocol. A link state protocol is used because it provides a fully-connected mesh topology (called a directed graph) that is distributed in each switch. Changes in the topology (link state changes) are event driven and are propagated through the switch fabric so that each switch rapidly converges on the current active topology graph of the network; in other words, each switch has an accurate representation of the topology at any given time. Link state changes include, but are not limited to, changes in operational status, administrative status, metrics, "cost" or bandwidth.

One of the key aspects of the link state protocol is that it runs completely "plug-and-play" out of the box, with no configuration whatsoever. The protocol is optimized to work in a "flat" or non-hierarchial fashion. Each switch is identified by a unique switch MAC address and links are identified by a unique link name formed by the switch MAC address concatenated with a port-instance of the link on the switch; the result is a unique "switch/port pair." This allows the protocol to know all switch nodes in the domain, as well as all of the links.

Since each call-originating switch has a topology graph, each switch can determine the "best" path for the calls it originates. Although all of the switches have a topology graph, only the call-originating switch uses it to determine a complete path for a connection flow. Other switches on the connection path never do path determination. The path is defined as a sequence of "switch/port pairs" which are traversed in order to get from the call-originating switch to the destination-owner switch (the destination owner switch is the switch to which the destination MAC address is locally attached). Note that the path is not determined from end system to end system; rather, it is the path connecting the ingress switch (the switch owner of the source) to the egress switch (the switch owner of the destination). Again, the topology graph only contains switch nodes and switch links; no users, end systems, networks or other forms of aggregation are known. In one embodiment, the path may comprise equal cost paths between the source and destination.

Each call-originating switch also performs connection management (making, breaking and rerouting calls) for traffic originating at its access ports. Calls are processed when there is no active connection for the source-destination MAC address on an arriving packet frame. Note that no connection management (nor call processing) is performed on network trunk ports. By having each access switch perform the connection management for the calls it is originating, the connection management is distributed around the "edges" (at the access switches) of the switch fabric. This means the connection processing load is directly related to the number of access switches and traffic on access ports. Since each switch processes its own local connection requirements, it scales very well, even as the size of the switch fabric or VLAN domain grows. The total call processing rate of the fabric becomes the additive rate of all of the access switches.

One of the significant benefits of determining connections based on the source-destination MAC addresses is that it allows the switches to treat each end-to-end flow as a unique and identifiable connection (flow). In addition, it allows the switches to support a fully active mesh topology. Unlike switches that forward or filter based only on the destination MAC address, the switches of the present invention use the source and destination MAC address in each frame to forward or filter. This allows multiple paths to a particular destination from different sources through the switch fabric. This is particularly useful in client/server models, because the server is effectively a common point, to which all the clients require access. Thus, the call processing of the present invention allows multiple paths to the server from different sources through the switch fabric.

Once the packet is call processed and resolved to a unicast MAC destination, the call-originating switch determines the path of switches and links to traverse (described previously) and explicitly maps a connection on that path for the source-destination MAC address of the packet being call processed. The connection is explicitly mapped on the determined path by a "threading the needle" algorithm. Threading the needle describes how the connection is "threaded" through the switches on the path one switch hop at a time. The connection mapping is done by having the call-originating switch generate a source-routed connect request message which contains the source-destination MAC addresses (connection key) for the call. The path information is actually the in-order list of switch/port pairs to traverse. This message is sent explicitly hop-by-hop on the source-routed path.

As each switch processes the message, it maps a connection for the source-destination pair. The inport and outport(s) for the connection mapping can be either implicitly or explicitly described by the message (implicitly by the port the message is received on; explicitly by being a named node and link in the path). However, the connections remain disabled (e.g., outport is null) until a response is received from the last switch on the path; this response (acknowledgment) enables each switch connection as it travels back on the return path to the call-originating switch.

Another important feature is that the connection threading is self-scaling since the connect request messages are sent on the actual paths the call will be mapped on. This means that as calls are load balanced on different end-to-end paths, so are the connection management messages and processing.

Another important feature is that each switch independently handles call rerouting. This is accomplished by each switch maintaining a "links-in-use" database for all connections going through the switch. As connections are mapped at each switch, the path of all the switches and links (i.e., the path information in the connect message) is maintained in a separate database. This essentially correlates links and nodes with a particular connection.

If any switch node or link changes state (e.g., failure), other switches in the fabric propagate the change as part of the link state protocol. Since each switch runs the link state protocol, it must process the node or link state change. Once it recomputes the topology graph, it searches the path database to determine if any of its active connections were using the node or link that changed state. Only if the connection was using a node or link that changed on some part of its path (e.g., a remote link on a path may have failed), the connections using that path will be unmapped. Thus, each switch having connections on a path that failed will tear down those connections traversing the path automatically, and autonomously. Connections not using that part of the path remain intact. In addition, when the call-originating switch has to tear down a call because some part of the path has a changed state in such a way as to warrant a re-route (e.g., a link failure or drastic change in cost), it will automatically recompute the path for the original call and re-establish a connection using the same technique of path determination in the connection management previously described. It is important to note that this too is completely distributed and that each switch will tear down the connections it has mapped if the path is no longer valid and each will automatically reroute calls they have originated. Since all access switches can do this, the call rerouting capability scales with the number of call-originating (access) switches in the fabric.

In another important aspect, the present invention is directed to resolving broadcast packets in order to significantly reduce the amount of broadcast traffic. This is accomplished by each switch being able to resolve broadcast packets at the switch access ports, rather than just tagging and flooding the broadcast packets. Each switch has a call processor for the major protocol families (e.g., IP and IPX) and well-known packet types.

Resolution to a non-broadcast address involves looking inside the packet and decoding the protocol layers and high level addressing and determining where the true destination of the packet is. For example, the switch looks inside an ARP broadcast packet for the target network address; then, the switch looks up in its local directory and/or the virtual directory for the MAC address bound to that network address (alias address). Thus, rather than flooding the ARP broadcast, the access switch resolves it to the true MAC destination and then establishes a connection from the ingress switch and egress switch for the source MAC address to the destination MAC address. The broadcast ARP packet is never forwarded past the access switch, and this leads to a significant reduction in broadcast traffic in the switch fabric.

In general, the only time a broadcast packet is forwarded beyond the access switch is when it cannot be resolved to a single unicast MAC address. This usually happens only with router and server advertisements.

The switches use an inter-switch control channel on which to send unresolvable (unable to switch point-to-point) packets. This control channel is formed with a single spanning tree between the switches. Rather than maintaining a separate spanning tree for each virtual LAN, only a single tree is maintained. The basis for the single tree is that only broadcast/multicast packets and unknown destinations (not heard at any access switch) need to be flooded. All other packets can be resolved to its single destination and switched/forwarded. Because each switch maintains a complete topology graph, the spanning tree is really a virtual spanning tree based on the topology graph, not on any separate protocol exchange.

Tag-based flooding is used to ensure that unresolvable broadcast packets are not flooded out all egress ports in the fabric. Because the entire VLAN domain of users (MAC addresses and VLAN mappings) is not distributed to all switches, these flooded packets must be tagged with a VLAN identifier. This tagging identifies the VLAN to which the packet belongs (usually based on the source of the frame). Essentially, the original packet is wrapped with a VLAN header which contains the source VLAN-ID. The tagging can be supported on a hardware-based switching engine or in a CPU-based switching engine and the tagged frames sent on the inter-switch control channel, using a multicast MAC address. At all egress switches, the frame is redirected from the connection engine and processed by the host agent. Here, the original packet, including its original framing, is unwrapped and transmitted out any access ports that match the VLAN-ID of the tagged frame.

Yet another aspect of the present invention allows the switched domain to co-exist and inter-network with legacy networks. Each switch incorporates "virtual router agents," which process the route and service advertisements they receive from multi-protocol routers and servers attached to the switch. The access switch summarizes and collapses the external networks, routes and services to only the "best" routes. The switch can then combine the best route information for the external networks and servers, with the best path information for other switches in the switched domain, to provide a combined best path to a network or server outside the switched domain. Note that the virtual router agents do not generate or propagate any advertising packets of their own. Rather, they automatically discover remote networks and servers which generate such advertisements. The virtual router has a state machine and metrics processing to calculate the best routes. The virtual router directory in an access switch is only active when a router is attached to an access port of that switch.

These and other aspects of the present invention will be more fully described in the following detailed description and drawings.

BRIEF DESCRIPTION OF THE DRAWINGS

FIG. 3a–3b is an example of a local directory cache;

FIG. 4a is an example of a remote directory cache;

FIG. 4b is an example of a broadcast/unknown directory cache;

FIG. 5a is a diagram of three switches connected sequentially to illustrate an example of an inter-switch resolve protocol;

FIG. 5b is a diagram of a node tree;

FIG. 6a is a diagram of a link state database;

FIG. 6b is a diagram of a link state neighbor database;

FIG. 6c is a diagram of a link state switching database;

FIG. 12 is a diagram of a Traffic Cnx table;

FIG. 13 is a diagram of a Traffic Link table;

FIG. 14 is an example of a "links-in-use" table;

DETAILED DESCRIPTION

Connection-Oriented Communications Networks

Figure 1:
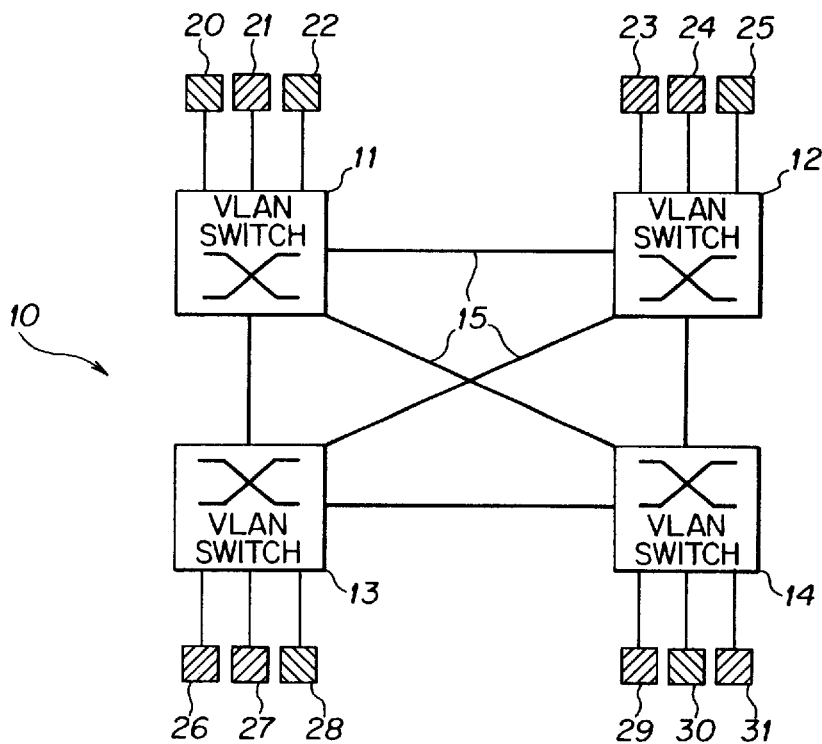
FIG. 1 is a schematic logical representation of a VLAN switch domain, including multiple VLANs.

Communications networks provide a capability for one device, referred to as a source, to transmit data to another device, referred to as a destination. There are two general types of network communications: connection-oriented; and connectionless.

In connection-oriented communications, a logical association is established between the source and the destination, so that several separate groups of data ("a data flow") may be sent along the same path that is defined by the logical association. This is distinguished from connectionless communications, in which the source transmits data to the destination without prior coordination. In connectionless communications, each frame of data is transmitted node-by-node independently of any previous frame. Bridges and routers are commonly used in connectionless communications.

Three phases generally occur during connection-oriented communications, including connection establishment, data transfer, and connection termination. In the connection establishment phase, the first time a source has data to be sent to a destination, a logical association, also called a connection or a path, is established between the source and the destination. The connection defines elements and connections between the elements, for example, the switches between the source and the destination, and the ports of the switches through which the data will pass. The path setup at the establishment phase is the path on which the data will be transmitted for the duration of the active connection.

A switch, and other devices similar in operation to a switch, may be referred to as a node, intermediate system, interface message processor, or gateway. A port is an interface on a switch or similar device that provides a physical communication path to other devices, for example to other ports of other switches. During the data transfer phase, data is transmitted from the source to the destination along the connection, which includes the port-to-port connections of the switches (cross-connect). After a certain amount of time, or at the occurrence of a certain event, the connection enters the termination phase, in which the connection is terminated, and the elements which made up the connection are freed to support other connections.

VLAN Switching With Connection-Oriented Switches

A VLAN is a "virtual local area network" of users having full connectivity (sharing broadcasts, multicast and unicast messages) independent of any particular physical or geographical location. In other words, users that share a virtual LAN appear to be on a single LAN segment regardless of their actual location.

Typically, VLANs are completely independent of each other; users on one VLAN cannot communicate directly (share broadcast, multicast or unicast packets) with users on other VLANs.

Generally, VLANs are restricted to configurations that are similar to extended LANs (bridged networks). For example, there may be limits on the number of MAC addresses in the VLAN; the number of network addresses in the LAN; the framing types supported; and for the overall VLAN domain, the number of active connections, number of switches and number of VLANs.

Generally, the ability to dynamically reconfigure a network is restricted to the VLAN domain; it does not extend across a router connecting one VLAN domain to another VLAN domain.

In the present embodiment, the functional goals of VLAN switching are extended to include:

"plug and play," i.e., usable right out of the box;

adaptive to changes in network topology;

enables a fully active mesh topology;

provides wire-speed switching from source to destination once connections are established;

manageable, via a MIB interface for ease of management and remote control;

scalableable, in terms of users, links and switch nodes;

provides a reduction in broadcast traffic;

enables policies to be defined per VLAN.

In accordance with one embodiment of the present invention, a VLAN switch is an internetworking device which switches packets at the physical layer (MAC-layer) and allows connectivity of users based upon VLAN mappings. By switching packets based only on physical layer addresses, e.g., the unique medium access control (MAC) address assigned to each end system by the IEEE, the network infrastructure remains protocol-insensitive. The source and destination MAC addresses alone, or in combination with the source inport on the switch, form a unique connection identifier for any communication exchange between designated end systems. Once the connection is established, the data packets can be transferred at essentially "wire-speed" from source to destination. See for example U.S. Pat. No. 5,485,455 to Dobbins et al. entitled "Network Having Secure Fast Packet Switching And Guaranteed Quality Of Service," issued Jan. 16, 1996, which is hereby incorporated by reference in its entirety.

The switching technology may be constructed as software and/or hardware including: software objects which exist in embedded devices as firmware; software objects which are part of an application on a commercial computer system; application specific integrated circuits (ASIC); or functionally equivalent hardware components.

FIG. 1 illustrates generally a logical view of an exemplary switched network with end systems on different VLANs. The representative network 10 has four switches 11–14, all of the switches being connected in a meshed topology by physical links 15 between network ports forming, e.g., point-to-point connections. The plurality of end systems 20–31 extend from access ports on various switches. The end systems are grouped into different subsets which have different VLAN identifiers (VLAN-IDs): default VLAN (17), red VLAN (18), and blue VLAN (19), respectively. As shown in FIG. 1, red VLAN includes end systems 20, 22, 25, 28 and 30, and blue VLAN includes end systems 21, 23, 24, 26, 27, 29 and 31. Default VLAN is a special VLAN to which all ports and end systems are initially assigned; after being reassigned to another VLAN, they are removed from the default VLAN.

The switching of packets between end systems on the same VLAN is performed by a connection-based switching engine. If the policy so provides, the engine will set up connections only for end systems having the same VLAN-ID. Each connection is defined by a combination of a "destination MAC address, source MAC address, inport" tuple.

The operation of this exemplary VLAN network will be discussed under the following subsections:

Directory Administration

Link State Topology Exchange

Connection Management

Exemplary SFPS Network

Resolving To Destinations Outside The Switch Domain.

Directory Administration

In this example, the directory administration is distributed among the various switching devices. Each switch has a local directory (see FIG. 3) of end system MAC addresses, alias addresses and VLAN mappings, only for end systems directly attached to it. When a user attached to a first switch (ingress or call-originating switch) needs to communicate with a user attached to a second switch (egress or destination switch), the first switch will need to resolve the MAC address of the destination user and the MAC address of second switch by a process known as "Virtual Directory Resolve."

Figure 2:
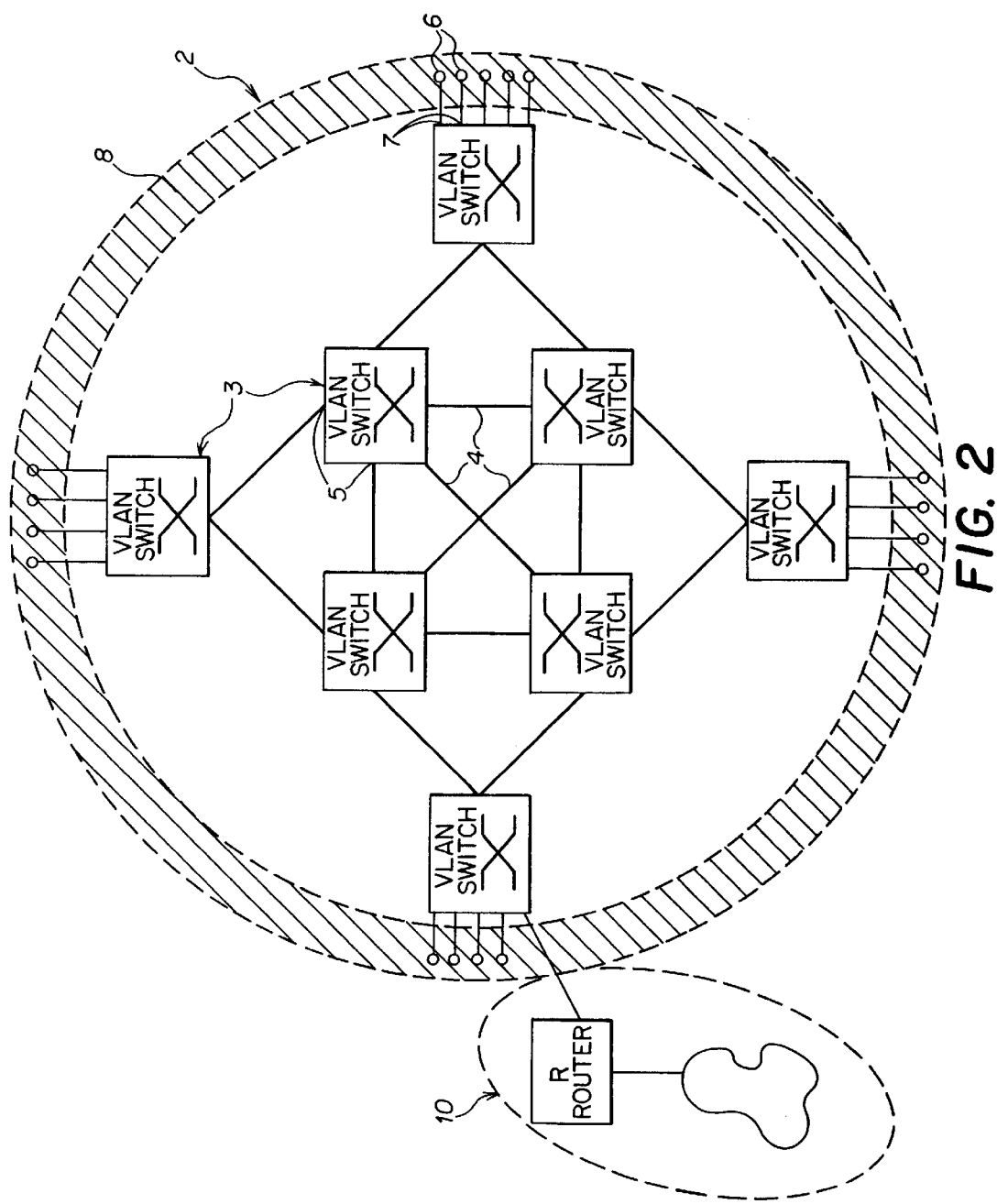
FIG. 2 is a schematic diagram of a virtual directory for a switch domain.

FIG. 2 illustrates a representative VLAN network 2 including a plurality of switches 3 having network ports 5 connected by links 4 in a meshed topology, and having access ports 7 connected to local end systems 6. The "Virtual Directory" 8 is shown as a shaded area between dashed lines, encircling the VLAN network 2 and including all of the users on end systems 6. The virtual directory comprises the collection of local directories (FIG. 3) contained at each access switch in the network, as described hereinafter. In addition, according to one embodiment of the invention, the Virtual Directory may include mappings to "external" networks 10, which are connected by a router R to an access switch (see the following section "Resolving To Destinations Outside The Switch Domain").

During a discovery time, each switch discovers its local connected end systems (i.e., switch 11 in FIG. 1 discovers end systems 20–22) in order to provide a mapping of end system MAC addresses to access ports, as well as a mapping of end system MAC addresses (or access ports) to VLAN-IDs. In this particular embodiment, a local directory is provided (see FIGS. 3a–3b) which contains all node related information including:

the node (e.g., machine address of the end system)

any upper layer (alias) protocol addresses discovered with the node the VLAN-IDs to which the node is mapped the local port(s) on which the node was discovered (plural for redundant links)

the owner switch(es) hardware address (plural for redundant access switches).

As shown in FIG. 3a, the local directory of nodes includes in column order: the "Switch Port" (to which the end system is attached); the "Device MAC Address" (for the attached end system or switch); the "Node State" ("local" for an attached end system, "virtual node" for an attached switch); "Call Tag" (for the call associated within this entry); "Last Heard" (the elapsed time since the attached device was last heard from); "Age" (the time since the node was discovered); "Alias Count" (the number of alias' mapped to the MAC end system); and "VLAN Count" (the number of VLANs to which the entry belongs).

FIG. 3b includes a mapping of user MAC address to higher layer protocol ("alias") addresses, such as network layer addresses, client addresses and server addresses. Use of these higher layer protocol addresses enables a VLAN management application to verify or place users in the correct location. For example, if a red VLAN maps to IP subnet 42, then the network layer mappings for all red VLAN users should show an IP address that also maps to subnet 42. The Local Directory with alias address information as shown in FIG. 3b includes the fields: "Owner Switch" (the owner of the attached end system); "Switch Port"; "Device MAC Address"; "Alias Type" (e.g., IP or IPX); "Alias Address"; "VLAN Policy" (discussed hereinafter); and "VLAN-ID" (e.g., red, blue, default).

The end system and/or VLAN mappings may be provided by an external application. Whether the mappings at each local access switch are done implicitly (e.g., by using a mapping criteria table or protocol-specific mappings) or explicitly (e.g., by using an external management application), the key point is that each access switch only maintains its locally attached users. Taken as a group, this combination of local directories provides the "Virtual Directory" which can easily scale to fairly large numbers of users.

Assignment of VLANs to individual ports is the simplest embodiment to administer and to engineer in a switch. A switch port can be assigned to more than one VLAN; however, all users on a port with multiple VLANs will see all of the cross-VLAN traffic. Alternatively, VLANs can be assigned based on IP subnets or end system MAC addresses.

In order to provide connectivity "out of the box" (prior to any VLAN administration), by default all switch ports and end systems belong to a common VLAN (for tag-based flooding), known as the default VLAN 17 (see FIG. 1). Once a port or end system is assigned to a specific VLAN, it is automatically removed from the default VLAN.

It may also be desirable to have VLAN switches discover and automatically place end systems in one or more reserved VLANs. For example, as switches discover IPX servers, they would be placed in the "IPX server" VLAN.

External services may communicate with the local directory via its application programming interface (API). Information may be added to the directory by those applications that require node related information to make switching decisions. The directory maintains the node information based on a set of rules, until the node is removed. External services may also request for a node to be deleted via the API.

As implemented in an object-oriented programming language, such as C++, the directory may comprise a class which provides the common API and manages the directory nodes and any tables used for queries. For example, the directory node table (FIG. 3a) and directory alias table (FIG. 3b) enable bi-directional queries, e.g., node-to-alias, or alias-to-node.

Local directory entries are stored in a local cache and are considered permanent entries, i.e., they do not age out by themselves but must be explicitly unmapped (deleted). A local directory cache hit (local resolve) occurs when a call-originating switch can resolve any mappings locally within its own local directory cache.

A local directory cache miss occurs when the call-originating (ingress) switch cannot resolve any mappings within its own local directory. The call-originating switch has to then issue a resolve request to the "virtual directory." This is accomplished by transmitting a resolve message to all other switches in the domain. More specifically, a Virtual Directory resolve message is sent out on a spanning tree of all switches. This effectively causes a concurrent lookup in the Virtual Directory since each switch will process the resolve message independently. Only the switch having the local directory mapping for the destination will respond; this responding switch is known as the "owner" switch. Multiple owners may exist if an end system is redundantly connected.

When the call-originating switch receives the resolved destination address, it is stored as a remote entry in another cache within the call-originating switch, known as a remote (resolve) directory cache. As shown in FIG. 4a (partial column headings only), the remote directory may be arranged substantially similar to the local directory (FIGS. 3a–3b). The entries in the remote cache reflect active or attempted connectivity resolutions, and thus are self-adjusting, i.e., the remote cache will size automatically to the actual resolution requirements of the call-originating switch. Remote directory entries need to be aged out, because a remote mapping may change without the call-originating switch receiving the new mapping. One alternative is to age shortly after any idle time for which the resolution entry was formed. Another alternative is to use a reference count for each resolution entry that increments with connections, and age it when the count goes to zero (i.e., connections are no longer associated with it).

If a resolve request times out, i.e., there is no known owner or the request/response is lost, then the call-originating switch will treat the destination as unknown and send it out on a restricted flooding basis. For example, an unknown destination may occur when a "passive" device attaches to a switch access port but is never learned (by transmitting a frame). Since the owner of the destination is unknown, the packet is sent to all switches for restricted flooding.

Rather than maintaining a separate spanning tree for each VLAN-ID, a single spanning tree is maintained for connecting all switches, and restricted flooding is accomplished by tagging the flooded packets with the source VLAN-ID. For example, an IEEE tagging format can be used to insure interoperability with various vendors' equipment. In one embodiment, the tagged frame may be generated by a host agent in a switching engine. The tagged frame is sent out on the spanning tree of switches, using a multicast MAC address. At all egress switches, the frame is redirected from the connection engine and processed by a host agent. Here, the original payload (original packet including framing) is unwrapped, and flooded out any access ports that match the VLAN-ID in the tagged frame.

As tagged frames are received at each egress switch, a small fast cache of source VLAN mappings and aliases may be maintained at each switch, known as a broadcast/unknown directory cache. As shown in FIG. 4b, (partial column headings only), the broadcast/unknown directory may include the same information as the local directory (node and alias)—FIGS. 3a–3b. This cache allows prompt resolution on the reply path if the unknown destination is on the egress switch. In essence, these entries form a directory of sources which have flooded broadcast or unknown destination packets. These flooded broadcast/unknown entries can be aged much quicker than the other directory entries, and need only be retained long enough for a reply to be received from an end system. If a reply from an end system forces a local resolve hit on an entry from the broadcast/unknown cache, this is considered an implicit remote resolve and the entry is promoted "up" into the remote directory cache at the egress switch. Once inside the remote cache, the entry will now age at the same level as entries resolved dynamically.

These different directories (or caches) can each exists as a separate directory service provider under a directory service container. This means that they can be turned on or off, or left completely out of a specific product. It also means that their use is hidden under the directory API and the resolve semantics—the call processors in the switch never know different directories exist.

EXAMPLE

The following is an example of a protocol for resolving a MAC address of a destination not directly attached to a call-originating switch.

As shown in FIG. 5a, switches 1–3 are connected sequentially with a first end station 32 (ES1) on a first switch 35, a second end station 33 (ES2) on a second switch 36, and a third end station 34 (ES3) on a third switch 37. Assume for example that switch 1 receives an ARP (ARP stands for Address Resolution Protocol, a TCP/IP protocol used to dynamically bind a high level IP address to a low level physical hardware address) packet from ES1 which is looking to resolve the address for ES3. Only after not being able to resolve in the local, remote, or virtual router directories, an inter-switch resolve server adds an entry to its inter-switch resolve table which is keyed by the originating switch (S1) and a call tag value. The call tag value is a unique ID given to each call that is accepted by a switch.

Switch 1 then creates a resolve request message which consists of the fields that it wants to resolve. In this case, the fields include the ethernet (network) address of ES3, the VLAN-ID that ES3 is assigned to, VLAN policy, and the switch (S3) on which ES3 is located. Switch 1 then calls a path service to determine which network port the request should be sent out on; this is a separate spanning tree of switches that form the inter-switch control channel. The path service returns a list of network ports which provide loop-free delivery to every switch in the domain; this step is repeated at each successive switch hop.

Switch 2 will receive the resolve request message. It will check its local resolve service to see if it can resolve the request. In this case, it cannot do so and it will add the message to its own interswitch resolve table and forward the message out its network ports to the other downstream switches. If there were no other switches downstream and switch 2 could not resolve the request, then it would set the status field to unknown and the operational field to response, and return the message back out the port that it came in on.

Since switch 2 does have a downstream switch neighbor (switch 3), switch 3 will receive the resolve request. From its local resolve service, it will resolve the directory mappings for ES3 and formulate a response message with the resolved address and VLAN information filled into the original message, along with the MAC address of switch 3 in the appropriate field indicating it as the "owner" of the resolved destination. It will then send the message back out the port it was received on.

Switch 2 will receive the response message and check its resolve table for the entry. The table will have a request count and a response count so the switch can keep track of how many requests and responses it has sent and received for a particular request. Once it receives all of its responses for a particular request, it forwards only one response back to the switch it received the request from. In this way, each switch will only receive one response for each request that it sends. This allows the mechanism to scale as the number of switches in the fabric increases.

Once switch 2 forwards the response back to switch 1, switch 1 will receive the message and process it. If a positive status is received, then the switch I will add the directory information of the resolve message to its remote directory and hand the resolved address to its call processing state machine.

The recursive method just described has more general applicability for sending request/response messages in a tree-based topology. For example, a simplified tree is shown in FIG. 5b consisting of five switches (S1 through S5) arranged as nodes on the tree. S1 is the root (first level); S2 and S3 are downstream neighbors of S1 (level 2); S4 and S5 are downstream neighbors of S2 and S3 respectively (level 3). The algorithm is self-similar at every node and scales to arbitrary depth and width of the tree. At each level, a node forwards a request message to all adjacent downstream neighbors, and waits for a response from each neighbor. It then formulates a single response which is forwarded back up the tree. An example of a recursive algorithm for walking a tree is the Dijkstra algorithm, described by R. Perlman, at pages 221–222, supra.

Link State Topology Exchange

Before a switch can set up a connection mapping, it must determine the outport mask for a particular "source MAC-to-destination MAC" flow called a connection. This is done by a path determination algorithm which depends on the link and switch node topology. For example, a shortest path may be chosen based upon metrics such as summation of link cost, number of calls allocated on each link in the path, etc. Alternatively, multiple equal-cost paths to a given destination may be chosen to provide load balancing (i.e., distribution of the traffic over the multiple paths equally). However, before a path to a destination can be chosen, the inter-switch topology must be determined.

In this embodiment, a link state protocol is defined for the determining the inter-switch topology. For a general discussion of link state routing, see Radia Perlman, "Interconnections: Bridges and Routers" (Reading, Mass.: Addison-Wesley, 1992), pages 221–222.

There are four basic components of a link state routing method. First, each switch is responsible for meeting its neighbors and learning their names. Hello packets are sent periodically on all switch interfaces in order to establish and maintain neighbor relationships. In addition, hellos may be multicast on physical media having multicast or broadcast capability, in order to enable dynamic discovery of a neighboring switch.

All switches connected to a common network must agree on certain parameters, e.g., hello and dead intervals, etc. These parameters are included in the hello packets; differences in these parameters will inhibit the forming of neighbor relationships. For example, the hello interval designates the number of seconds between a switch's hello packets. The dead interval defines the number of seconds before declaring a silent (not heard from) switch down. The hello packet may further include a list of neighbors, more specifically the switch IDs of each switch from whom valid hello packets have recently been seen on the network; recently means in the last dead interval.

A second basic component (of a link state method) is that each switch constructs a packet known as a "link state packet" or "LSP" which contains a list of the names and costs to each of its neighbors. Thus, when an adjacency is being initialized, "database description packets" are exchanged which describe the contents of a topological database. For this purpose, a poll-response procedure is used. One switch is designated a master, and the other a slave. The master sends database description packets (polls) which are acknowledged by database description packets sent by the slave (responses). The responses are linked to the polls via the packet's sequence numbers.

The main portion of the database description packet is a list of items, each item describing a piece of the topological database. Each piece is referred to as a "link state advertisement" and is uniquely identified by a "link state header" which contains all of the information required to uniquely identify both the advertisement and the advertisement's current instance.

A third basic component (of a link state method) is that the LSPs are transmitted to all of the other switches, and each switch stores the most recently generated ILSP from each other switch.

For example, after exchanging database description packets with a neighboring switch, a switch may find that parts of its topological database are out of date. A "link state request packet" is used to request the pieces of the neighbor's database that are more up to date. The sending of link state request packets is the last step in bringing up an adjacency.

A switch that sends a link state request packet has in mind the precise instance of the database pieces it is requesting (defined by LS sequence number, LS checksum, and LS age). It may receive even more instances in response. Each advertisement requested is specified by its LS type, link state ID, and advertising switch. This uniquely identifies the advertisement, but not its instance. Link state request packets are understood to be requests for the most recent instance (whatever that might be). "Link state update packets" carry a collection of link state advertisements one hop further from its origin; several link state advertisements may be included in a single packet. Link state update packets are multicast on those physical networks that support multi-cast/broadcast. In order to make the flooding procedure reliable, flooded advertisements are acknowledged in "link state acknowledgment packets." If retransmission of certain advertisements is necessary, the retransmitted advertisements are carried by unicast link state update packets.

In summary, there are five distinct types of link state advertisements, each of which begins with the standard link state header:

hello
database description
link state request
link state update
link state acknowledgment.

Each link state advertisement describes a piece of the switch domain. All link state advertisements are flooded throughout the switch domain. The flooding algorithm is reliable, insuring that all switches have the same collection of link state advertisements. This collection of advertisements is called the link state (or topological) database. From the link state database or table (see FIG. 6a), each switch constructs a shortest path tree with itself as the root. This yields a link state switching table (see FIG. 6c), which is keyed by switch/port pair. FIG. 6b is an example of a link state neighbor table.

The following fields may be used to describe each switch link.

A "type" field indicates the kind of link being described. It may be a link to a transit network, to another switch, or to a stub network.

A "link ID" field identifies the object that this switch link connects to. When connecting to an object that also originates a link state advertisement (i.e., another switch or a transit network), the link ID is equal to the other advertisement's link state ID. The link ID provides the key for looking up an advertisement in the link state database.

A "link data" field contains information which depends on the link's type field. For example, it may specify a switch's associated port name, which is needed during building of the switching table, or when calculating the port name of the next hop.

A "metrics" field contains the number of different "types of service" (TOS) metrics for this link, not counting a required metric field TOS 0. For each link, separate metrics may be specified for each type of service. The metric is the cost of using an outbound switch link, for traffic of the specified TOS.

Every switch originates a "switch links" advertisement. In addition, at any given time one of the switches has been elected to serve as the "Designated Switch." The Designated Switch also originates a "network links" advertisement for each transit network (i.e., multi-access network that has more than one attached switch) in the area. The "network links" advertisement describes all switches attached to the network, including the designated switch itself. The advertisement's link state ID field lists the Switch ID of the designated switch. The distance from the network to all attached switches is zero, for all types of service; thus the TOS and metric fields need not be specified in the "network links" advertisement.

A fourth main component (of a link state method) is that each switch, now armed with a complete map of the topology (the information in the LSPs yields complete knowledge of the graph), computes a path to a given destination. Thus, once the LSPs have been distributed and proper protocol adjacencies formed, a Dijkstra algorithm (see R. Perlman, pp. 221–222, supra) may be run to compute routes to all known destinations in the network. This is discussed further in the following section entitled "Connection Management."

Some of the beneficial features of the link state protocol described herein are summarized below.

The link state protocol does not require configuration information. Instead, it employs the MAC address of a device for unique identification. Ports are also uniquely identified using the switch MAC address and a port number instance.

In addition, the link state protocol has no network layer service provider, as it operates at the MAC layer. As a result, the protocol incorporates the required features that are typically provided by a network layer provider, such as fragmentation.

In order to provide network layer services, the link state protocol uses a well-known Cabletron Systems, Inc. multicast address (00001D000000) for all packets sent and received. This enables all media to be treated as shared broadcasts, simplifying the protocol.

Due to the "flat" nature of switched fabrics, and the unrelated nature of MAC address assignments, the present protocol does not provide for summarization of the address space (or classical IP subnet information), or level 2 routing (IS-IS Phase V DECNet). There exists a single area, and every switch within that area has a complete topology of the switch fabric.

Because a single domain exists for the switch fabric, there is no need to provide for interdomain reachability.

Rather than calculating the best next hop as in other link state shortest path first algorithms, the present protocol method calculates the best next hops for the entire path. This is significant in that the path is only determined once, instead of at each switch hop. Also, it prevents a recalculation of the path by any switch hop on the path if the topology happens to be changed while a call is being set up.

The link state protocol also notifies the connection services in each switch of any link/node state changes; this enables a "distributed call rerouting" mechanism. For example, upon receipt of a link "down" message, each switch would inspect current connections (active calls) in an active call (links-in-use) database, and for any entry including the newly demised link, the connection is unmapped; in addition the call-originating switch establishes a new connection. This provides synchronization between the physical topology changes and mapped connections. The time necessary to reroute is coupled to the convergence of the network. Thus, a connection map request will never be made until the physical topology has already been updated.

Connection Management

A traffic service is responsible for creating, rerouting and tearing down connections within the switching fabric. There are three state machines: ingress, intermediate, and egress, that implement the traffic service. Each portion of a connection is controlled by the state machine matching its location.

The call-originating switch, to which the source user (end system) is attached, is the ingress. Egress is the switch where the destination user (end system) is located. Intermediate is any switch along the path, where the connection arrives and departs via network links. By these definitions, a connection may have only one ingress and one egress, plus zero to some maximum number of intermediate switches. On any switch, the traffic service may act as all three types for different connections.

The traffic service has three clients: connect service, link state protocol, and accounting. The connect service uses the traffic service to establish end-to-end connections. The link state protocol informs the traffic service of remote and local link state changes to allow for rerouting. Accounting uses the traffic service to tear down connections which are no longer needed.

At the end of this section, three state flow diagrams (FIGS. 9–11) are discussed to illustrate the ingress, intermediate and egress switch functionalities. First, a general overview of the call origination process will be discussed which includes the issues of applying policy restrictions, resolving broadcasts, and restricted flooding of broadcast/unknown packets.

Figure 7A:
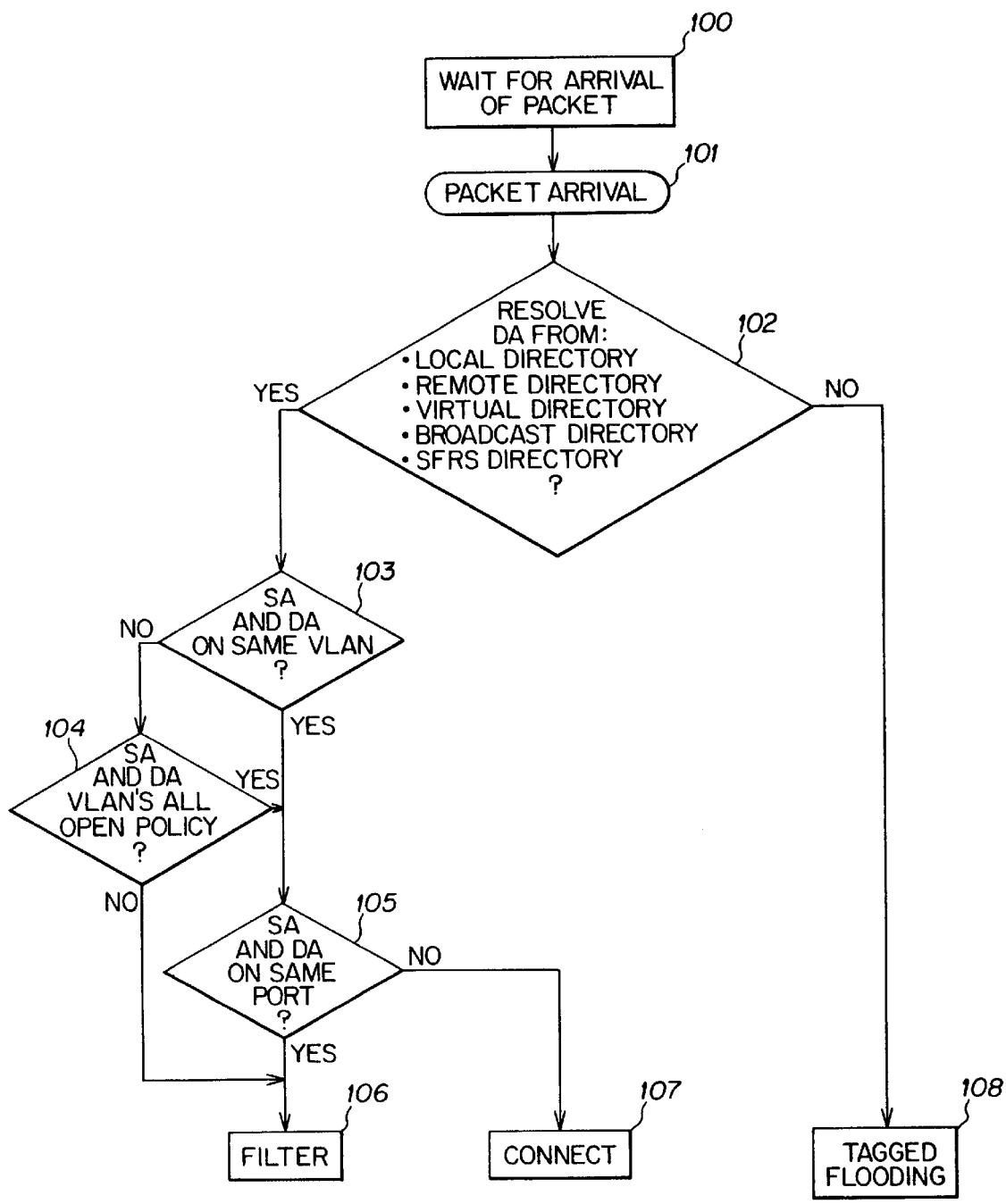
FIG. 7a is a flowchart of the general call processing method performed by the ingress switch.

As illustrated in the flow chart of FIG. 7a, the ingress switch waits for the arrival of a packet (step 100). Upon packet arrival (step 101 ) the ingress switch examines the packet for source address (SA) and destination (DA), and notes the inport on which it received the packet. It then needs to resolve the destination MAC address. If the destination MAC address is known, the ingress switch checks its local directory and remote directory for a mapping to the owner switch of the destination address (step 102). If not found, the ingress switch checks the virtual directory by issuing a remote request to the other switches. If it has a broadcast packet, the packet may be given to a protocol-specific call processor which decodes the packet to find the network source and destination addresses, and then for example sends an ARP request to get the target switch MAC address. If still unknown, the ingress switch checks an SFRS directory of destinations located throughout the switch domain (see the following discussion entitled "Resolving To Destinations Outside The Switch Domain").

Figures 7B, 7C, 8:
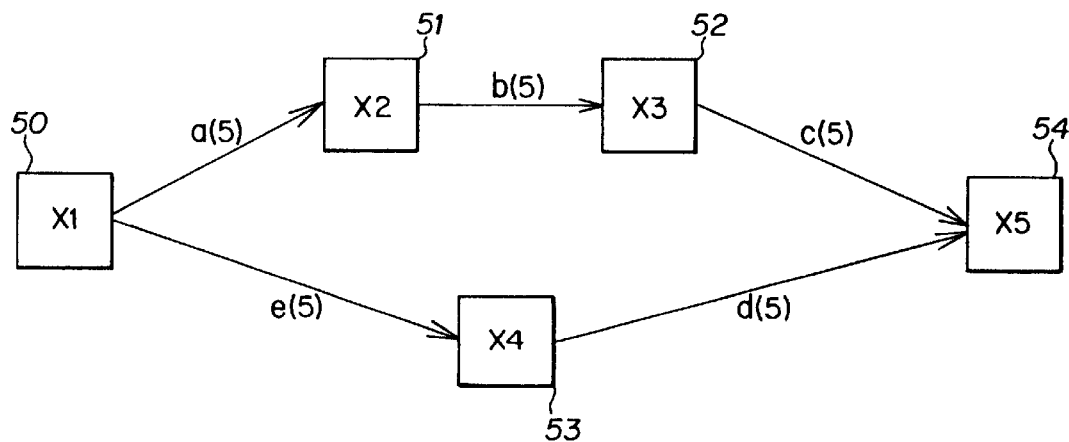
FIG. 7b–7c are examples of VLAN policy rules tables.
FIG. 8 is a diagram of a portion of a switch network to illustrate an example of a path determination service.

Once the destination switch address is resolved, the ingress switch then checks to see if the source address (SA) and destination address (DA) are on the same VLAN, i.e., have the same VLAN-ID (step 103). This is the point at which an access policy rule may be applied. For example, as shown in FIG. 7b, two policies are provided for resolved unicast packets: open and secure. An open policy allows all connections. A secure policy allows a connection only if the source and destination have the same VLAN-ID; otherwise the packet is filtered. Thus, in FIG. 7a, if the SA and DA have the same VLAN-ID, and the source and destination are not on the same switch port (step 105), then the method proceeds to establishing a connection (step 107). If the source and destination are on the same port (step 105), then the packet is filtered (i.e., dropped) (step 106). If the source and destination do not have the same VLAN ID, then in step 104 the ingress switch checks to see whether the source and destination both have an open policy (which allows all connections); if both have an open policy (step 104), then the packet is either filtered or connected depending upon whether the source and destination are on the same port (step 105).

If the destination address is not resolved at step 102, then the packet is sent for restricted flooding (step 108). Otherwise, a connection is established for the source-destination. This is described below.

FIG. 7c illustrates a table of VLAN policy rules for unresolved (e.g., broadcast) packets. A "don't care" policy results in the packet being flooded based on the source VLAN-ID.

The following is a general example of applying metrics to the path determination.

EXAMPLE

As illustrated in FIG. 8, a path select request may be made at a call-originating switch X1 (50), for a destination switch X5 (54). The protocol returns the best (meaning lowest aggregated metric) path to X5. This would be the path "e,d" (through switch X4 (53)), assuming like media and default metric assignments. Path "e,d" has a value of 10. Path "a,b,c" (through switches X2 (51) and X3 (52)) has value of 15 and would not be chosen. Should link "e" fail, the path "a,b,c" would take over and continue to provide connectivity. Should the value of the metric be manipulated such that path "a,b,c" and path "e,d" were of equal value, the protocol would return both to the path selection request.

Figure 9:
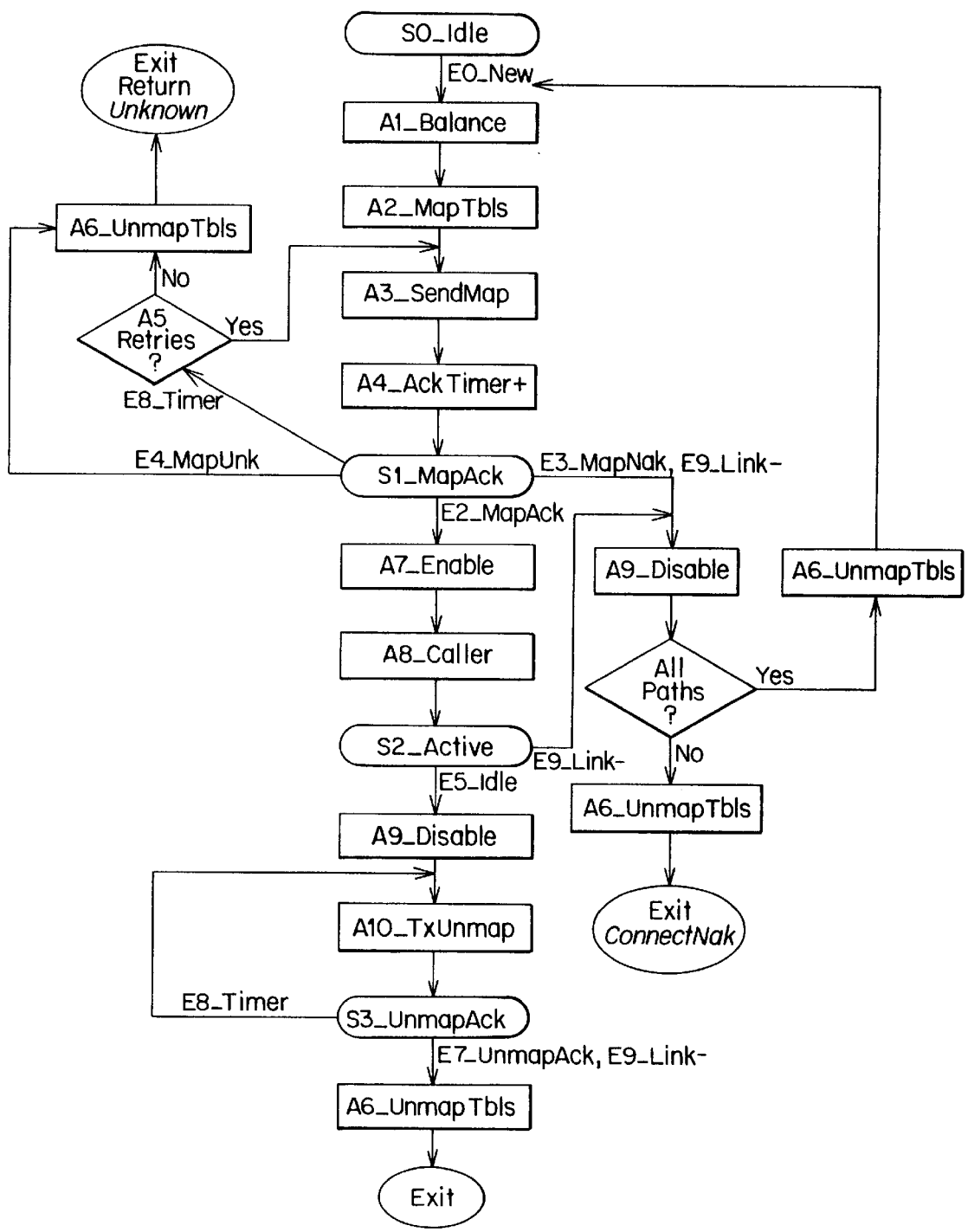
FIG. 9 is a diagram of an ingress state machine.
Figure 10:
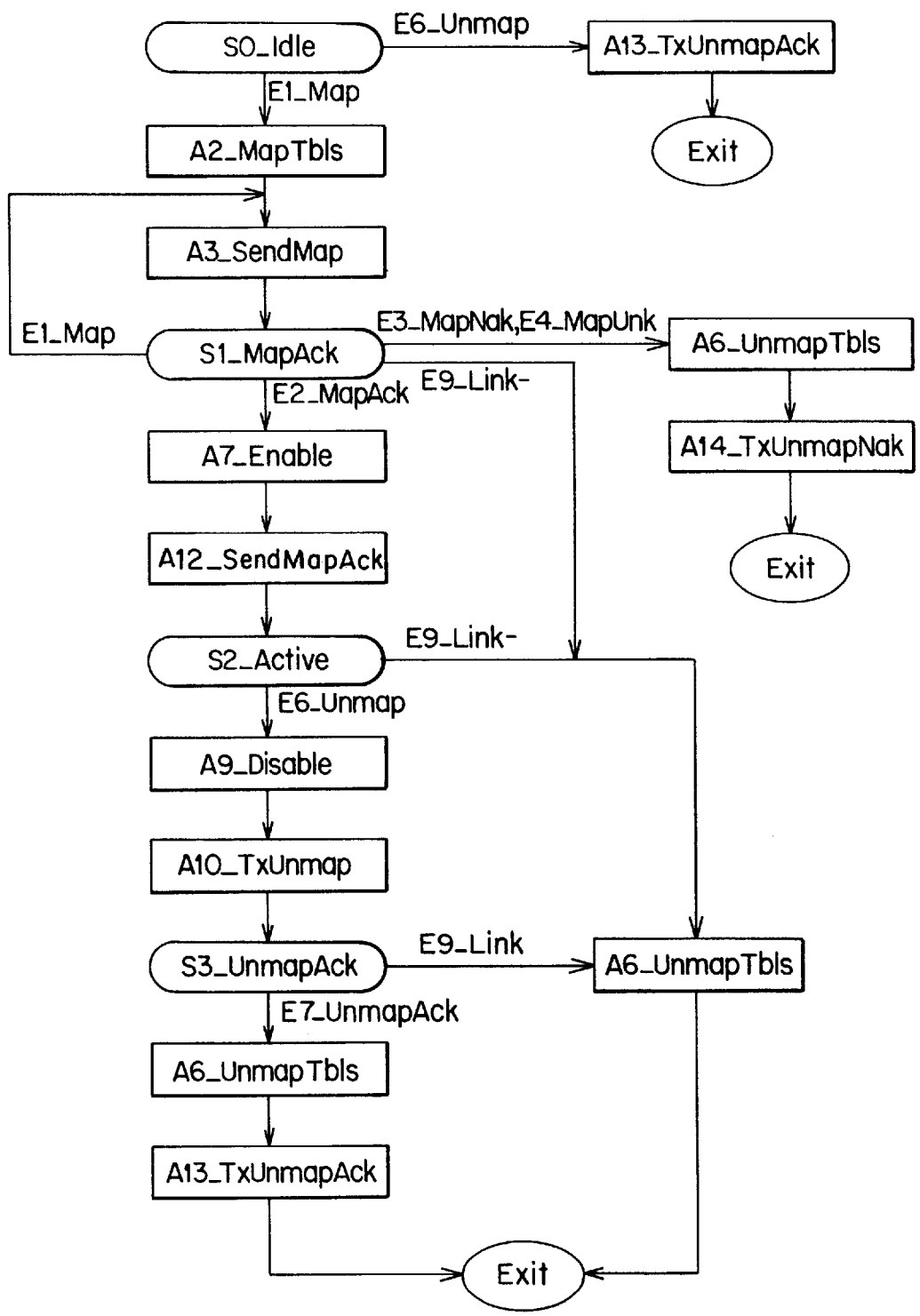
FIG. 10 is a diagram of an intermediate state machine.
Figure 11:
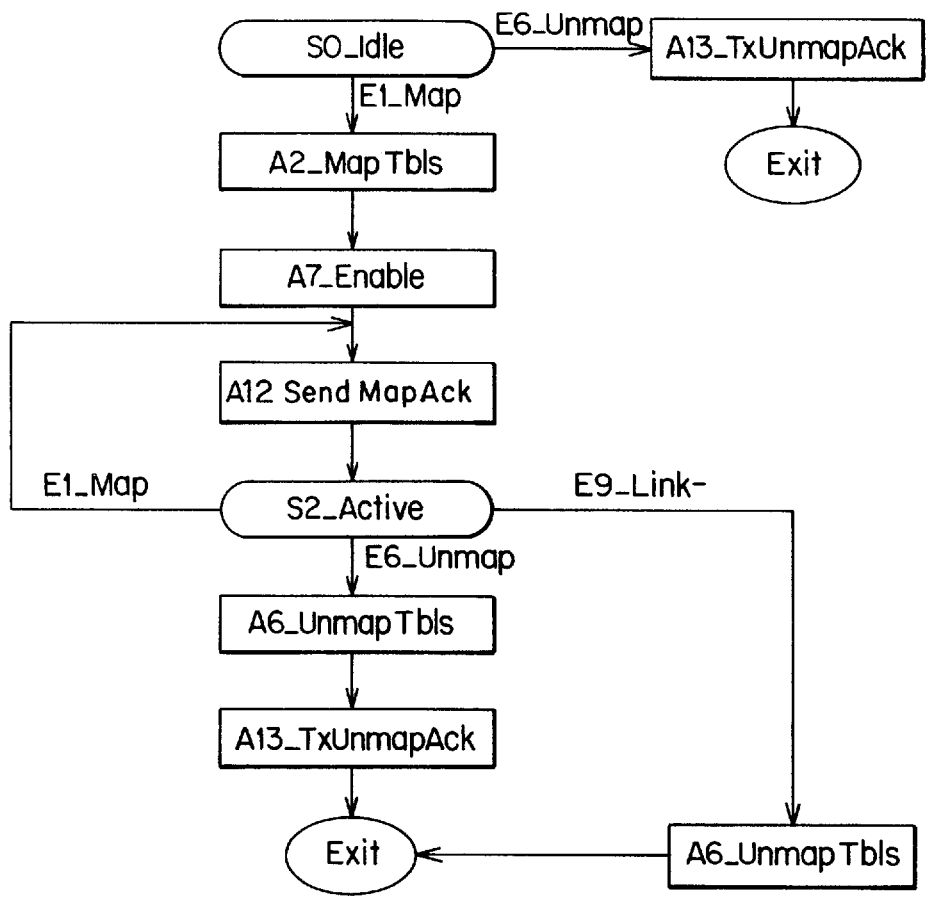
FIG. 11 is a diagram of an egress state machine.

In the flow state diagrams of FIGS. 9–11, describing the state machines for the ingress, intermediate and egress switching functions, the following conventions apply:

any text in italic represents a variable used in the description;

Cnx is an abbreviation for a connection key, in this case "destination MAC address, source MAC address, inport";

only the traffic service maps or unmaps inter-switch connections;

a connection may be created in an engine, but not yet activated to pass data (e.g., outport mask of zeros);

a path service returns an "in-order hops chain" from source to destination switches.

FIG. 9 describes the flow of a representative ingress state machine, for which the following state descriptions, event descriptions and exit descriptions apply; note that all states are shown in the flow diagrams as Sn_text, where Sn is the state ID and the text helps describe the sequence of events outlined in the state diagram.

TABLE 1

State Descriptions

| ID | Name | Description |
|---|---|---|
| S0 | Idle | Starting state |
| S1 | MapAck | Awaiting MapAck message after sending Map request |
| S2 | Active | Connection is up and running |
| S3 | UnmapAck | Awaiting UnmapAck message after sending Unmap request |

TABLE 2

Event Descriptions

| ID | Name | Description |
|---|---|---|
| E0 | New | New connection request made on an Ingress switch. The new event includes a Cnx and a list of equal cost Paths. |
| E1 | Map | Receive a Map request with a Cnx and Path in the message. Not seen on Ingress switches. |
| E2 | MapAck | Receive a Map Ack for a Map Message. |
| E3 | MapNak | Receive a Map Nak for a Map Message. A switch will Nak if it is out of resources. |
| E4 | MapUnk | Receive a Map Unknown for a Map Message. An Egress switch sends this if it does not have the destination user anymore. Also an Intermediate switch can send this if the next hop link does not exist. |
| E5 | Idle | Accounting has elected to remove Cnx. |
| E6 | Unmap | Receive a Unmap request with a Cnx and Path in the message. Not seen on Ingress switches. |
| E7 | UnmapAck | Receive a Map Ack for a Map Message. |
| E8 | Timer | Acknowledgment timer has expired. It is a one shot timer. |
| E9 | Link- | Secure Fast Link State Protocol (SFLSP) has detected a link failure. |

TABLE 3

Exit Descriptions

| ID | Name | Description |
|---|---|---|
| 0 | Unknown | Can't find destination, caller will flood. |
| 1 | Nak | No resources or Path, caller will filter (drop). |
| A1 | Balance | Load balance among alternate equal cost paths provided by Path Service. |

TABLE 3-continued

Exit Descriptions

| ID | Name | Description |
|---|---|---|
| A2 | MapTbls | Create a new entry in the TrafficCnx table. Add or update the TrafficLink table for each hop in the connection by adding a Link to Cnx relationship. Then go back and make the Cnx to Link relationship in the TrafficCnx table. Lastly add an inactive Cnx to the engine. |
| A3 | SendMap | Create and send a Traffic Map out the first link in the path. |
| A4 | AckTimer+ | Start Ack Timer. Use number of hops to determine the timer value. MaxRetries is set at one. |
| A5 | Retries? | Increment Retry Count and text if it exceeds MaxRetries. |
| A6 | UnmapTbls | Delete Cnx from engine. Remove Cnx from TrafficCnx table. Unmap Cnx from any Links using it. If any links connection count hits zero, remove them from the table. |
| A7 | Enable | Activate Cnx in the engine. |
| A8 | Caller | Activate Caller with a ConnectAck Code. |
| A9 | Disable | Mark a Cnx in the engine as disabled. |
| A10 | TxUnmap | Create and send Traffic Unmap message. Note this retries until success or a link-event. |
| A11 | Paths? | Is an alternate path available? |
| A12 | SendMapAck | Send a MapAck back along a Path. |
| A13 | TxUnmapAck | Send an UnmapAck back along a Path. |
| A14 | TxUnmapNak | Send UnmapNak/Unknown back along a Path. |

FIG. 10 is an intermediate state flow diagram; it only follows orders from the ingress switch of the connection.

FIG. 11 is an egress state flow diagram; it only follows orders from the ingress switch of the connection. It also makes the acknowledge/not acknowledge decision.

FIG. 12 shows the Traffic Cnx Table and FIG. 13 shows the Traffic Link Table.

In summary, the ingress switch resolves the destination end system and destination switch, determines a path, and sends a source-routed connect message (containing an in-order list of switch nodes and links in the path) to set all switches on the path. Each switch on the path maps a connection in its switching table (FIG. 6c) based on the source-destination MAC address pair. The final (egress) switch on the path sends a path acknowledgment signal back to the ingress switch, and then the ingress switch forwards the data. The data remains as transparent packets, i.e., the data packets are not modified at each switch hop with next-hop routing data.

Each switch on the path maintains a "links-in-use" database (see FIG. 14), which includes all of the links for any active call path. When the link state protocol detects that a link has failed, each switch in the path receives a link state advertisement notifying it of that fact. If the link is in use (by any active connection) then the connection(s) using the failed link are unmapped before additional data packets are sent over the failed link. This ability of each switch to "look ahead" reduces the number of lost or dropped packets. The ingress switch selects a new route and sends a new inter-switch connect message with the new path. All network or trunk switches unmap connections using the failed link and all access switches re-route any originated calls using the failed link.

Figure 15:
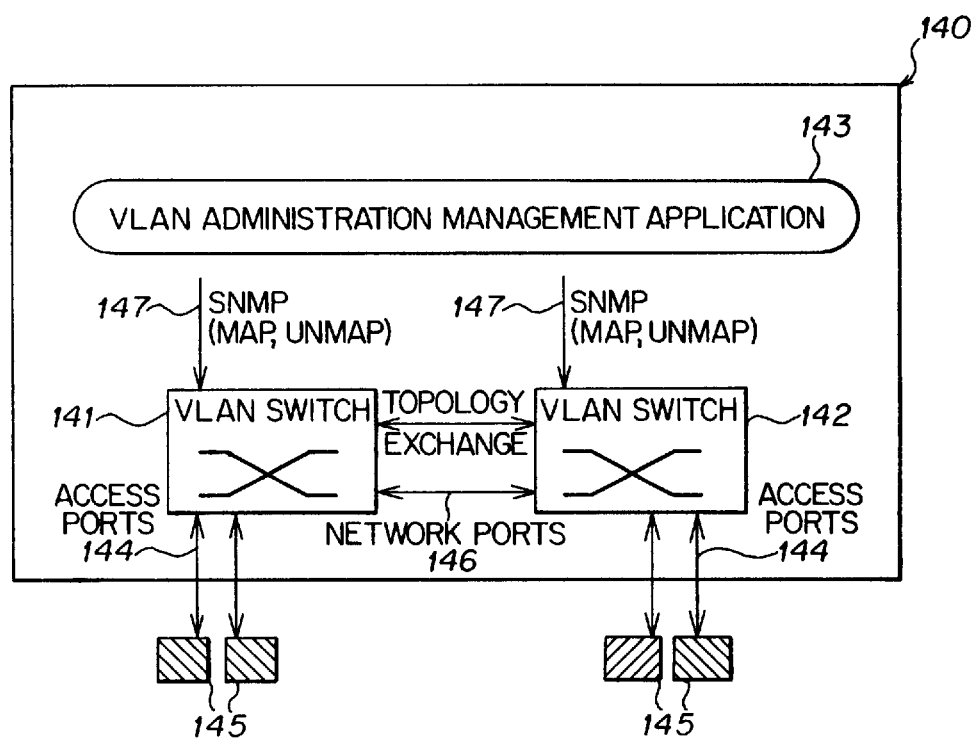
FIG. 15 is a schematic illustration of a VLAN domain, illustrating the management of the VLAN switches.

FIG. 15 illustrates schematically a VLAN domain 140 in which a plurality of VLAN switches 141, 142 are managed by a VLAN management application 143. The switches have access ports 144 connected to end systems 145, and network ports 146 connecting the switches. As previously discussed, a topology exchange occurs between switches 141 and 142.

The management application 143 communicates with each switch on links 147 via the SNMP (Simple Network Management Protocol) messaging protocol.

The switches may contain SMNP MIBs for element management and remote control of the switch elements. The managed objects accessible by the MIB (Management Information Base) may be accessed with the standard SNMP Get, GetNext, and Set messages. The MIB interface allows an external application to assign the VLAN mappings to access ports and/or end systems.

Exemplary SFPS Network and Switches

Figure 16:
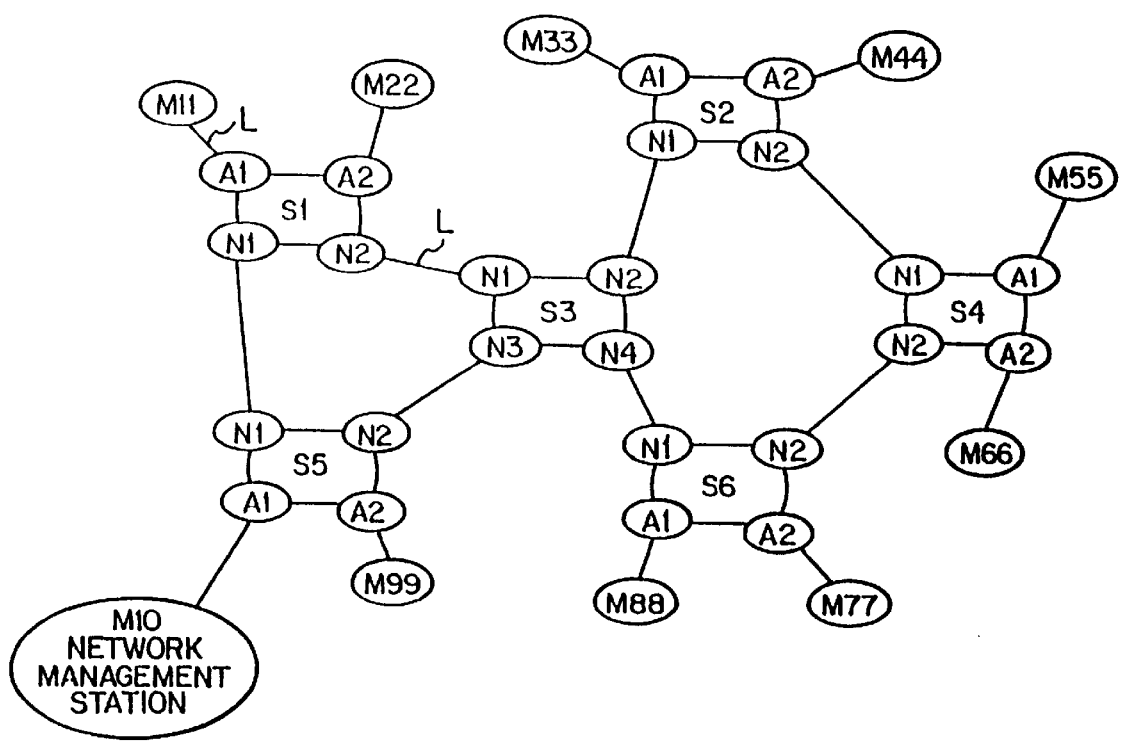
FIG. 16 is a schematic illustration of a network topology built with SFPS switches.

FIG. 16 shows a representative network topology built with six secure fast packet switches (SFPS) labeled S1–S6 and connected by links L. Each switch has for example four ports; some ports are labeled A for access and some are labeled N for network. The end systems are connected to the access ports by links L and are labeled "$M_{13}$". One end system is a network management station (NMS) or server (M1O), which may also include an external connection service and/or a VLAN management application.

Figure 17:
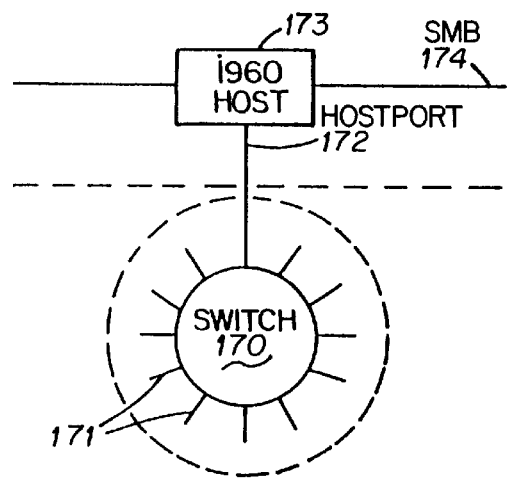
FIG. 17 is a schematic illustration of an SFPS switch.

FIG. 17 is a schematic illustration of an SFPS switch 170 having a plurality of ports 171. A host port 172 connects the switch to its host CPU 173, which may be an I960 microprocessor sold by Intel Corporation. The host CPU is connected to a system management bus (SMB) 174 for receipt and transmission of discovery and other control messages.

Figure 18:
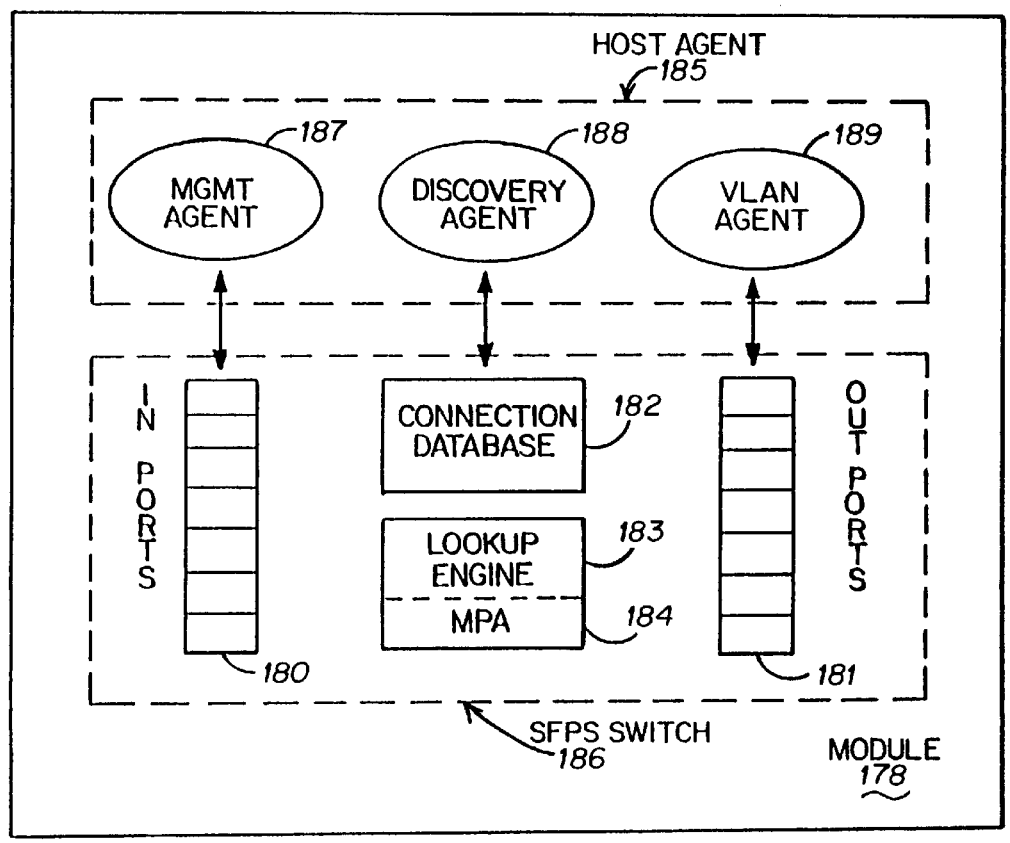
FIG. 18 is a logical view of an SFPS switch.

FIG. 18 illustrates the internal operation of a switch module 178. The switch includes inports 180, outports 181, a connection database 182, a look-up engine 183, and a multilevel programmable arbiter MPA 184. The switch 186 sends and receives messages from the host agent 185, which includes a management agent 187, a discovery agent 188, and a VLAN agent 189. The management agent 187 provides external control of the switch through the network management system M1O. The discovery agent 188 provides a mapping of local end systems to switching ports through a passive listening (snooping) capability. Adjacent switches are also discovered and mapped through an explicit switch-to-switch protocol (non-passive). The VLAN agent maps VLANs to access ports or end systems.

Resolving To Destinations Outside The Switch Domain

Another feature of the present invention is to provide a method for resolving the reachability of destinations located outside the switch domain, namely somewhere beyond the access switches. End systems external to the switch domain are resolved to an edge switch, by which the end system can be reached. Use of this method results in a lower percentage of broadcast flooding and provides an improved topological view of networks outside of the switch domain.

Figure 19:
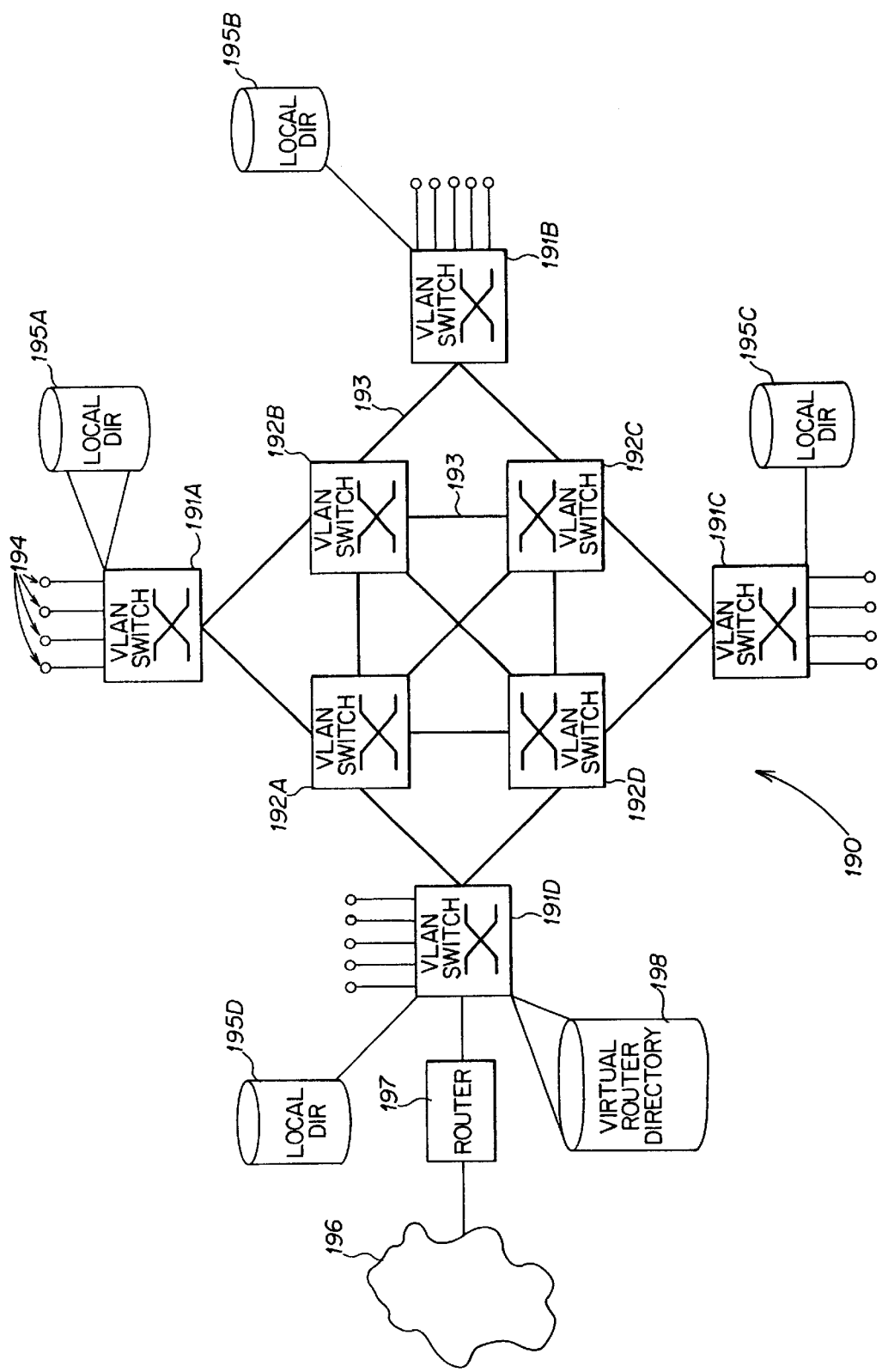
FIG. 19 is a schematic diagram of an external network attached via a router to an access switch of a switch domain.

FIG. 19 illustrates a fully-active meshed switch domain 190, consisting of access switches 191A–D and network switches 192A–D, each connected by a point-to-point link 193. The switches have network ports connected to other switches, and access ports connected to end systems 194. Each access switch has a local directory 195A–D. A network 196, outside of the switch domain, is connected via a router 197 to one of the access switches 191D. In accordance with this invention, a virtual router directory 198D is provided for resolving the reachability of destinations in the external network.

The method is referred to herein as Secure Fast Routing Services (SFRS). SFRS is a discovery and resolve (directory) service that is co-located within all VLAN switches, but is only activated when a router or server is connected to the access port of the switch (i.e., at access switch 191D). It is a manageable service and in the present embodiment, enables resolution of the reachability of destination IP and IPX networks that are located somewhere behind an access switch; in addition, for IPX clients it enables finding of the nearest IPX Netware server.

In the following discussion, the term "Internal" means that the destination network to which a particular host is attached is located within the switch domain. For internal hosts, the normal connection request call setup is executed (see previous discussion).

As used herein, the term "External" implies that the destination network is located behind an access (edge) switch. In this case, SFRS will pass to the ingress switch the MAC or network address of the egress switch (attached to the destination network) and the ingress switch will set up a VLAN connection between the source host and the egress switch MAC address.

The SFRS includes IP and IPX secure fast routing servers that receive and glean routing advertisements. The advertisements are used for building internal network and server topology tables. The SFRS devices do not send advertisements; their purpose is to maintain topology tables and resolve destination network addresses or network servers to a MAC address.

SFRS is one of a plurality of resolve servers that are queried during the connection setup. As previously discussed with respect to FIG. 7a, the other resolve servers include the local directory, remote directory, virtual directory and broadcast/unknown directory. If the SFRS server cannot resolve the network address, the call processing code queries the other resolve server agents (either before or after the SFRS server). If not found, one of the resolve agents may perform a remote query through the switch domain (the virtual directory), as previously discussed. All remote switches receive this query and traverse their table of resolve servers, one being SFRS.

The SFRS resolve function is called by the ingress switch call processor to resolve a destination network address, Netware server, or other protocol service to a MAC address. SFRS returns EXTERNAL if the ingress switch must connect to an egress switch MAC, and returns INTERNAL or UNKNOWN when it cannot resolve to an egress switch.

Example IPX Netware Topology

Figure 20:
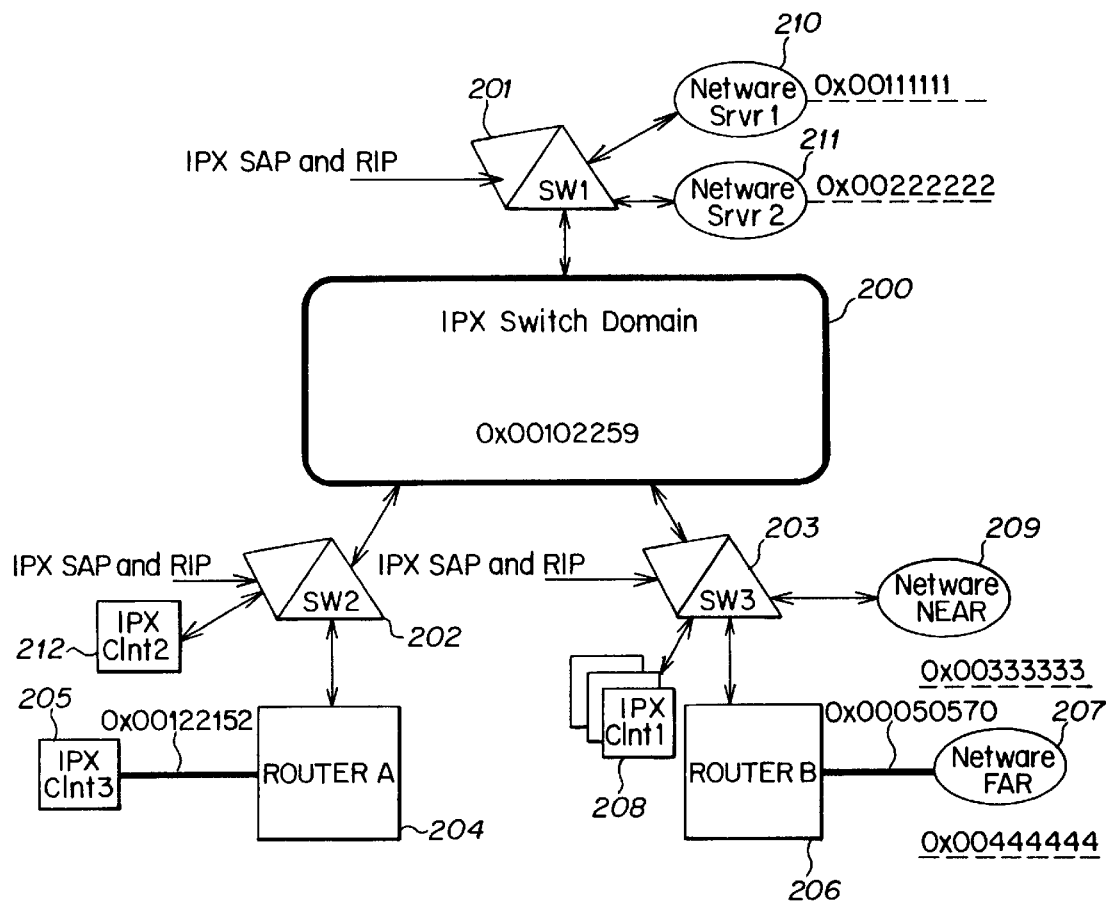
FIG. 20 is a diagram of an IPX switch and routing network.

FIG. 20 depicts an example IPX switch domain 200 connected to clients and servers through routers and access switches. All access switch devices 201–203 are connected to the IPX external network 0x00102259. There are two other external IPX addresses connected to routers: Router A (204) has network 0x00122152 and client 3 (205) on the same segment, and Router B (206) has network 0x00050570 and Netware Server FAR (207). Routers A and B are also connected to the IPX switch network 0x00102259. Client 1 (208) and Server NEAR (209) are directly attached to the IPX switch network through access switch 3 (203). Servers Srvr1 (210) and Srvr2 (211) are directly attached to the IPX switch network through access switch 1 (201).

An external IPX network address is bound to a physical media segment like LAN or WAN and is denoted in FIG. 20 as a solid bold line. An internal IPX network address is a logical network assigned to each Netware server and is denoted in FIG. 20 by a dashed line.

Netware RIP and SAP Advertisements

Netware servers advertise their service reachability using a routing protocol called SAP, Service Advertisement Protocol. Access switches discover the Netware severs via broadcasts within the IPX broadcast group on their access ports only. They collect and glean these advertisements and then periodically resend the advertisements for those routers and servers that are behind them.

In FIG. 20, Netware servers Srvr1 (210) and Srvr2 (211) advertise their network services using SAP through access switch SW1 (201). SW1 places Srvr 1 and Srvr 2 into its SAP table (shown below) along with their MAC addresses and floods the advertisement over the IPX VLAN (200). Srvr 1 and Srvr2 advertise the reachability of their internal networks using RIP. Srvr1's internal net is 0x00111111 and Svr2's is 0x00222222. SW1 receives and floods these RIP advertisements separately and then updates them into its RIP table (shown below). Server NEAR (209) works the same way as Srvr 1 and 2, except that it enters through SW3 (203) and has an internal address of 0x00333333. Server FAR (207) is behind Router B (206) so Router B advertises FAR's services and its internal network address of 0x00444444; FAR's services and network address will be associated with the MAC address of Router B. Routers A and B advertise the reachability of their external network addresses using RIP; Router A's external address is 0x00122152 and Router B's is 0x00050570.

The following server tables enable access switches 1 and 3 to respond to SAP requests:

Access Switch 1 SAP View

| Server Name | ServerNet | Server Type | Hops | NextHop MAC |
|---|---|---|---|---|
| Srvr1 | 0x00111111 | 0004 | 1 | 00:00:1d:01:01:01 |
| Srvr2 | 0x00222222 | 0004 | 1 | 00:00:1d:02:02:02 |

Access Switch 3 SAP View

| Server Name | ServerNet | Server Type | Hops | NextHop MAC |
|---|---|---|---|---|
| FAR | 0x00444444 | 0004 | 2 | 00:00:1d:00:00:0B |
| FAR | 0x00444444 | 0072 | 2 | 00:00:1d:00:00:0B |
| NEAR | 0x00333333 | 0004 | 1 | 00:00:1d:03:03:03 |

The following RIP server tables are for access switches 1, 2 and 3:

Access Switch 1 IPX Rip View

| Network | Hops | Next HopNet | NextHop MAC | Type of Net | Location |
|---|---|---|---|---|---|
| 0x00102259 | 0 | 0x00102259 | 00:00:1d:00:01:01 | Routed | Internal |
| 0x00102259 | 0 | 0x00102259 | 00:00:1d:02:02:02 | Routed | Internal |
| 0x00111111 | 1 | 0x00102259 | 00:00:1d:00:01:01 | Server | External |
| 0x00222222 | 1 | 0x00102259 | 00:00:1d:02:02:02 | Server | External |

Access Switch 2 IPX Rip View

| Network | Hops | Next HopNet | NextHop MAC | Type of Net | Location |
|---|---|---|---|---|---|
| 0x00102259 | 0 | 0x00102259 | 00:00:1d:00:01:0A | Routed | Internal |
| 0x00122152 | 1 | 0x00000000 | 00:00:1d:00:00:0A | Routed | External |

Access Switch 3 IPX Rip View

| Network | Hops | Next HopNet | NextHop MAC | Type of Net | Location |
|---|---|---|---|---|---|
| 0x00102259 | 0 | 0x00102259 | 00:00:1d:03:03:03 | Routed | Internal |
| 0x00102259 | 0 | 0x00102259 | 00:00:1d:00:00:0B | Routed | Internal |
| 0x00050570 | 1 | 0x00102259 | 00:00:1d:00:00:0B | Routed | External |
| 0x00333333 | 1 | 0x00102259 | 00:00:1d:03:03:03 | Server | External |
| 0x00444444 | 2 | 0x00102259 | 00:00:1d:00:00:0B | Server | External |

Netware Internal Connection Setup

The following method describes an internal connection setup on the IPX network of FIG. 20:

Access switch 3 (203) receives a "get nearest server" request from IPX client 1 (208) requesting attachment to any file server.

Access switch 3 calls the SFRS resolve function to obtain nearest server.

SFRS returns with the IPX internal address and MAC address of its nearest server, NEAR (209), and that it is INTERNAL.

Access switch 3 makes a connection from client 1 MAC address to Server NEAR's MAC address and then issues a "get nearest server" unicast to NEAR's MAC address.

Server NEAR responds with its file service called NEAR and its internal network address 0x00333333.

Client 1 broadcasts an IPX RIP request asking about the reachability of the internal network 0x00333333. Access switch 3 calls SFRS to resolve the address of 0x00333333.

SFRS determines that 0x00333333 is INTERNAL and returns with Server NEAR's physical MAC address.

Access switch 3 unicasts the RIP request to NEAR, the server NEAR issues a RIP response and then the session is complete if client 1 wishes to login to NEAR.

Netware External Connection Setup

The following method describes an external connection setup on the IPX network of FIG. 20:

IPX client 2 (212) "attaches" to Netware Server NEAR (209) from access switch 2 (202) to access switch 3 (203) as described in the Netware Internal Connection Setup above, except that it is resolved through a remote query call.

Client 2 wishes to login to the Server FAR (207) which it found by looking into the Server NEAR's name bindery table to obtain FAR's internal address 0x00444444.Client 2 issues a RIP broadcast about the reachability of FAR's internal address.

Access switch 3 calls SFRS to resolve the address 0x00444444.

SFRS determines that 0x00444444 is EXTERNAL and returns with router B's (206) MAC address.

Access switch 3 sets up a connection between the MAC of client 2 and MAC of Router B and then unicasts a RIP request to router B.

Router B responds with the reachability information on network 0x00444444. All further messages destined to Server FAR from client 2 are forwarded through router B. The switch connection is between client 2 and router B's MAC addresses.

Example IP Topology

Figure 21:
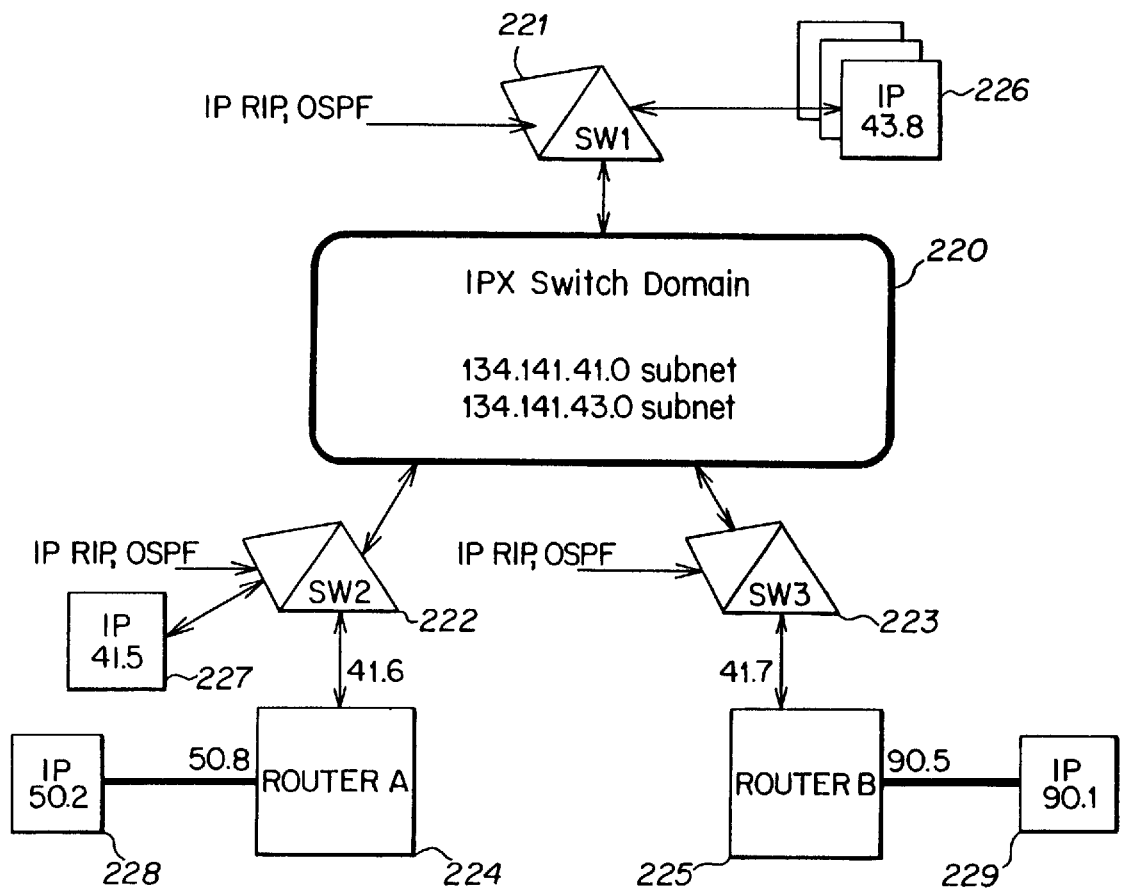
FIG. 21 is a diagram of an IP switch and routing network.

FIG. 21 depicts an example IP network topology employing SFRS, which includes IP Hosts interconnected by routers and access switches and which covers the 134.141.0.0 network. The network is subnetted using the mask 255.255.255.0. There are four IP subnets shown. The switch backbone (220) is comprised of the 134.141.41.0 and 134.141.43.0 subnets. Two of the other subnets are found behind edge routers; 134.141.50.0 subnet (228) behind Router A (224), and 134.141.90.0 subnet (229) behind Router B (225). Access switches 1–3 (221–223) discover the IP routes via broadcasts within the IP broadcast group of the switch domain. IP routers advertise the reachability of networks by using IP RIP or OSPF. These advertisements are also collected and periodically resent.

The following IP RIP routing tables are for access switches 1–3:

Access Switch 1 IP Routing Table

| IP Network | Hops | NHopNet | Type | Location |
|---|---|---|---|---|
| 134.141.41.0 | 0 | 0.0.0.0 | Static | Internal |
| 134.141.43.0 | 0 | 0.0.0.0 | Static | Internal |

Access Switch 2 IP Routing Table

| IP Network | Hops | NHopNet | Type | Location |
|---|---|---|---|---|
| 134.141.41.0 | 0 | 0.0.0.0 | Static | Internal |
| 134.141.41.0 | 0 | 134.141.41.6 | Static | Internal |
| 134.141.43.0 | 0 | 0.0.0.0 | Static | Internal |
| 134.141.50.0 | 0 | 134.141.41.6 | Routed | External |

Access Switch 3 IP Routing Table

| IP Network | Hops | NHopNet | Type | Location |
|---|---|---|---|---|
| 134.141.41.0 | 0 | 0.0.0.0 | Static | Internal |
| 134.141.41.0 | 0 | 134.141.41.7 | Routed | Internal |
| 134.141.43.0 | 0 | 0.0.0.0 | Static | Internal |
| 134.141.90.0 | 1 | 134.141.41.7 | Routed | External |

IP Internal Connection Setup

The following method describes an internal connection setup on the IP network of FIG. 21:

Access switch 2 (222) receives an ARP broadcast from 41.5 (227) requesting a connection to 43.8 (226).

IP Call Processing Agent in Access switch 2 calls SFRS to resolve the 43.8 IP address.

The IP SFRS searches its route table for 43.8. It should not find it and therefore assumes net address can be found within the switch domain and returns INTERNAL. The access switch 2 should attempt a direct connection to 43.8.

Access Switch 2 may resort to flooding the ARP request if it cannot resolve it from its other resolver servers. If it floods, the connection is set up when 43.8 replies.

IP External Connection Setup

The following method describes an external connection setup on the IP network of FIG. 21:

Access Switch 2 (222) receives an ARP broadcast from 41.5 (227) requesting a connection to 90.1 (229).

IP Call Processing Agent in Access switch 2 calls IP SFRS to resolve the 90.1 IP address.

The SFRS searches its route table and returns with the 90.1 IP address as EXTERNAL and connects to Router B at 90.5 using Router B's MAC address.

Access Switch 2 makes a VLAN connection to router B at 90.5 on behalf of 90.1.

Interfacing To Secure Fast Routing Services

Figure 22:
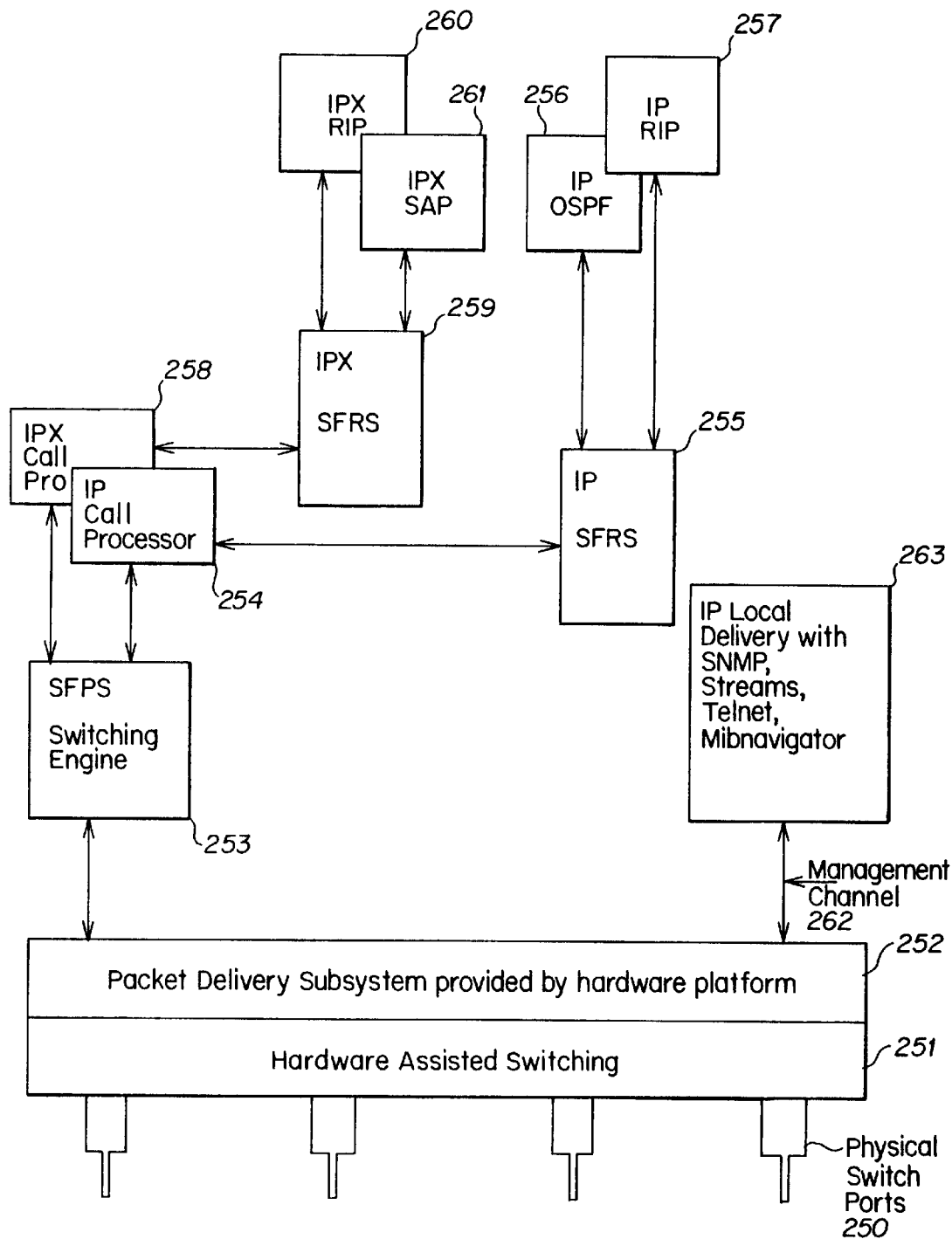
FIG. 22 is a diagram of the Secure Fast Routing Services (SFRS) components.

FIG. 22 illustrates the components of the Secure Fast Routing Services (SFRS). Starting at the bottom level, physical switch ports 250 are connected to a hardware assisted switching component 251, which sits below the packet delivery subsystem 252 provided by the hardware platform. Broadcast and host bound unicasts are given to the SFPS switch engine 253 which propagates them to one of the IP or IPX call processors 254 or 258, or rechannels them to the management host port 262 for IP local delivery 263 (with SNMP, streams, telnet, and MIB navigator) to consume, i.e., drop, the packet. The IP and IPX call processors (254 and 258 respectively) deliver broadcast packets and resolve calls to their respective Secure Fast Routing Services (255 and 259, respectively) using an application programming interface. The IP and IPX Secure Fast Routing Services (255 and 259, respectively) deliver the broadcast packet and resolve calls to the proper routing protocol using their respective IP OSPF (256), IP RIP (257), or IPX RIP (260) and IPX SAP (261) tables.

Figure 23:
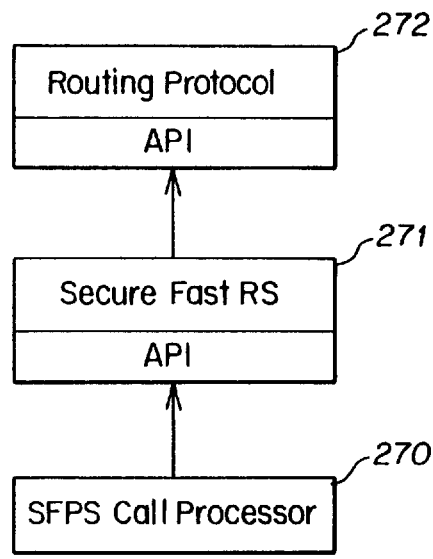
FIG. 23 is a general illustration of packet delivery from the SFPS switch to the SFRS.

The SFPS delivery system insures that OSPF, IP RIP, IPX RIP and SAP advertisements not only get delivered to the Secure Fast Routing Services, but also get propagated throughout the routing protocol's VLAN. This is illustrated generally in FIG. 23. On reception of a routing protocol advertisement, the SFPS call processor 270 passes the packet to the Secure Fast Routing Services (271) by calling its delivery function and supplying the correct parameters described in the SFRS API. The SFRS (271) relays the packet to the proper routing protocol engine (272). The routing protocol engine will glean the advertisements and build their topology table.

Figure 24:
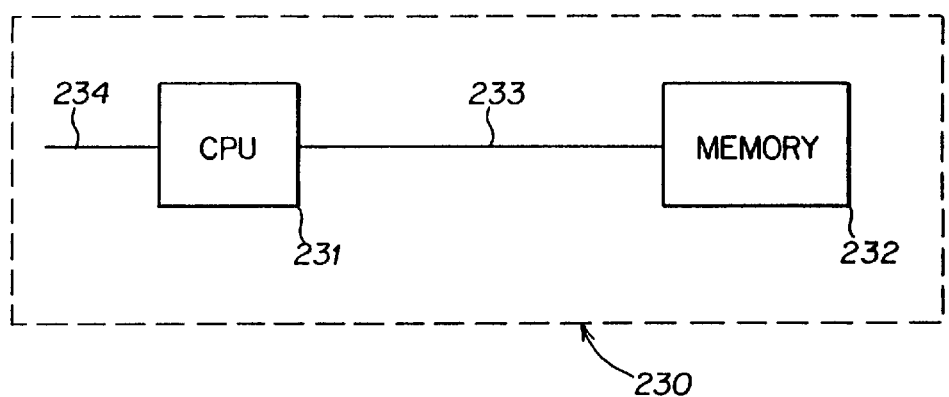
FIG. 24 is a schematic illustration of a computer apparatus.

Any of the above embodiments may be implemented in a general purpose computer 230 as shown in FIG. 24. The computer may include a computer processing unit (CPU) 231, memory 232, a processing bus 233 by which the CPU can access the memory 232, and access to a network 234.

The invention may be a computer apparatus which performs the functions of any of the previous embodiments. Alternatively, the invention may be a memory 192, such as a floppy disk, compact disk, or hard drive, which contains a computer program or data structure, for providing to a general purpose computer instructions and data for carrying out the functions of the previous embodiments.

Having thus described several particular embodiments of the invention, various modifications and improvements will readily occur to those skilled in the art. Accordingly, the foregoing description is by way of example only, and not intended to be limiting.

We claim:

1. A method of forwarding data packets in a switched communications network, the network including a plurality of end systems and switches connected by links, the switches having access ports connected to end systems and network ports connected to other switches, and each end system having a unique physical address, the method comprising the steps of:

each one of the switches maintaining a directory of local mappings for access ports or end systems attached to the access ports of the one switch and remote mappings of end systems or access ports attached to other switches;

when a first packet is received on an access port of a first switch, the first switch accessing its directory to find a mapping according to a destination address in the first packet;

when a mapping is not found at the first switch in the director, forwarding a resolve message from the first switch to other switches, the forwarded resolve message being a request for a resolution from another switch according to the destination address in the first packet; and the first switch waiting for a response to its forwarded resolve message prior to forwarding the first packet.

2. The method of claim 1, wherein a local mapping includes at least one of:

physical addresses of end systems locally attached to the one switch;

alias addresses of end systems locally attached to the one switch;

virtual LAN identifiers (VLAN-IDs) for the access ports or end systems attached to the one switch; and VLAN policy.

3. The method of claim 1, wherein a remote mapping is one of an active or attempted connectivity resolution.

4. The method of claim 1, wherein a remote mapping in the remote directory includes at least one of:

physical addresses of the other switches that provided the connectivity resolutions;

physical addresses of end systems attached to the other switches;

alias addresses of end systems attached to the other switches;

VLAN-IDs for access ports or end systems attached to the other switches; and

VLAN policy.

5. The method of claim 1, wherein each switch exchanges switch link state topology information.

6. The method of claim 5, wherein the first switch uses its switch link state topology information to determine a path from a source switch to a destination switch.

7. The method of claim 6, wherein the switch link state topology information includes switch/port pairs and each switch has a single physical layer address, and wherein each switch/port pair comprises the physical address of a switch and a port instance.

8. The method of claim 7, wherein the first switch sends a connect message with a physical address of source end system and a physical address of destination end system as a connection identifier for mapping connections in all switches on the path.

9. The method of claim 8, wherein the connect message includes an in-order list of switch/port pairs on the path.

10. The method of claim 9, wherein the first packet is not forwarded by the first switch until the first switch receives a connect message response from the last switch on the path.

11. The method of claim 10, wherein the connect message maps connections as it travels through the switches on the path, but the mapped connections remain disabled until receipt of a response sent by the last switch on the path which travels back through each switch on the reverse path to the first switch.

12. The method of claim 6, wherein each one of the switches on the path maintains a "links-in-use" table of all links in the path.

13. The method of claim 12, wherein upon receipt of a predetermined link state topology message regarding one or more of the links in the path, each switch on the path accesses its links-in-use table and unmaps any connection for the one or more links identified in the predetermined link state topology message.

14. The method of claim 13, wherein the predetermined link state topology message indicates that a link has failed.

15. The method of claim 6, wherein a path determined by the first switch includes multiple active paths.

16. The method of claim 15, wherein the multiple paths are for the same source switch and destination switch.

17. The method of claim 1, wherein the first switch attempts to map a broadcast packet to a single destination address in order to reduce an amount of broadcast traffic on the network.

18. The method of claim 17, wherein the first switch attempts to map the broadcast packet by looking inside the packet and decoding protocol layers and higher-level addressing to determine a physical address of the single destination.

19. The method of claim 1, wherein when the first switch cannot find a mapping according to the destination address, the first switch sending the first packet on a virtual spanning tree path to all other switches, and tagging the packet with a VLAN-ID which limits the egress ports on the other switches through which the first packet is forwarded.

20. The method of forwarding data packets according to claim 1, further comprising the steps of:
when the first packet is received on the access port of the first switch, the first switch independently determining a call path from a source end system to a destination end system through one or more of the switches based on a unique connection identifier which includes the source and destination end system physical address.

21. The method of claim 20, wherein the first switch enables directory resolution, topology exchange, and connection services.

22. The method of claim 20, wherein the first switch independently determines a new call path upon receipt of a predefined switch link state topology message.

23. The method of claim 20, wherein the call path includes multiple paths.

24. The method of claim 3, wherein the multiple paths are for the same source switch and destination switch.

25. A method of forwarding data packets in a switched communications network, the network including a plurality of end systems and switches connected by links, the switches having access ports connected to end systems and network ports connected to other switches, and each end system having a unique physical address, the method comprising the steps of:
each one of the access switches maintaining a directory of local mappings for access ports or end systems attached to the access ports of the one access switch and remote mappings of end systems or access ports attached to other switches mapped to one or more virtual LAN identifiers (VLAN-IDs);

when a first packet is received on an access port of a first switch, the first switch accessing its directory to find a mapping according to a destination address in the first packet;

when a mapping is not found at the first switch in the director forwarding a resolve message from the first switch to other switches, the forwarded resolve message being a request for a resolution from another switch according to the destination address in the first packet; and waiting for a response to the forwarded resolve message prior to forwarding the first packet.

26. The method of claim 25, wherein the remote mappings in the directory are limited to active or attempted connectivity resolutions.

27. An apparatus for forwarding data packets in a switched communications network, the network including a plurality of end systems and switches connected by links, the switches having access ports connected to end systems and network ports connected to other switches, and each end system having a unique physical address, wherein each switch comprises:
means for maintaining a directory of local mappings for access ports or end systems attached to the access ports of the respective one switch and remote mappings of end systems or access ports attached to other switches; and wherein a first switch comprises:
means for accessing when a first packet is received on an access port of the first switch, its directory to find a mapping according to a destination address in the first packet;

means for forwarding a resolve message from the first switch to other switches when a mapping is not found in the directory at the first switch, the forwarded resolve message being a request for resolution from another switch according to the destination address in the first packet; and means for forwarding the first packet once a response to the forwarded resolve message has been received.

28. The apparatus according to claim 27, further comprising:
means for removing a remote mapping when a predetermined time period has elapsed since it was last accessed.

29. The apparatus according to claim 27, wherein a remote mapping is one of an active connection and an attempted connection resolution.

* * * * *